US012152534B2

(12) United States Patent
Skilton et al.

(10) Patent No.: US 12,152,534 B2
(45) Date of Patent: Nov. 26, 2024

(54) SYSTEMS AND METHODS FOR PROPULSION

(71) Applicant: Clear Ascent Corp., Bellevue, WA (US)

(72) Inventors: Neil Tewari Skilton, Bellevue, WA (US); Joshua Mundt, Bellevue, WA (US); Stuart Greenwood, Bellevue, WA (US); Samuel Avery Eads-Ford, Bellevue, WA (US); Caleb Khim Taing, Bellevue, WA (US)

(73) Assignee: CLEAR ASCENT CORP., Bellevue, WA (US)

(*) Notice: Subject to any disclaimer, the term of this patent is extended or adjusted under 35 U.S.C. 154(b) by 0 days.

(21) Appl. No.: 18/308,984

(22) Filed: Apr. 28, 2023

(65) Prior Publication Data
US 2023/0348083 A1 Nov. 2, 2023

Related U.S. Application Data

(63) Continuation of application No. PCT/US2021/057781, filed on Nov. 2, 2021.
(Continued)

(51) Int. Cl.
F02C 7/22 (2006.01)
B64D 27/24 (2006.01)
(Continued)

(52) U.S. Cl.
CPC ............. F02C 7/22 (2013.01); B64D 27/24 (2013.01); B64D 27/33 (2024.01); B64D 27/355 (2024.01);
(Continued)

(58) Field of Classification Search
CPC ... F02C 7/22; F02C 9/40; B64D 27/24; B64D 27/33; B64D 27/355; B64D 33/08;
(Continued)

(56) References Cited

U.S. PATENT DOCUMENTS 5,513,498 A * 5/1996 Ackermann .......... F25B 25/005
62/51.1
6,641,084 B1 11/2003 Huber et al.
(Continued)

FOREIGN PATENT DOCUMENTS

| DE | 102017223803 A1 | 6/2019 |
| WO | WO-2020079419 A1 | 4/2020 |
| WO | WO-2022098677 A1 | 5/2022 |

OTHER PUBLICATIONS

Ji, et al. Thermodynamic analysis of a solid oxide fuel cell jet hybrid engine for long-endurance unmanned air vehicles. Energy Conversion and Management 183:50-64 (2019).
(Continued)

Primary Examiner — Todd E Manahan
Assistant Examiner — Rene D Ford
(74) Attorney, Agent, or Firm — Wilson Sonsini Goodrich & Rosati

(57) ABSTRACT

The present disclosure provides systems and methods for propulsion. The system may comprise one or more motor assemblies for driving at least one shaft or rotor of a vehicle. The motor assemblies may comprise one or more motor windings and/or magnets. The system may comprise one or more fuel cells in fluid communication with the motor assemblies. The fuel cells may be configured to generate electrical energy from a fuel that is directed through a portion of the motor assemblies to (i) cool the motor windings and the magnets and (ii) and heat the fuel before the fuel enters the fuel cells. The system may comprise a combustion chamber in fluid communication with the fuel
(Continued)

cells. The combustion chamber may be configured to combust an exhaust flow from the fuel cells to (i) react unused hydrogen exhausted from the fuel cells and (ii) provide thermal and/or mechanical power.

29 Claims, 29 Drawing Sheets

Related U.S. Application Data

(60) Provisional application No. 63/108,887, filed on Nov. 3, 2020.

(51) Int. Cl.
| | |
|---|---|
| *B64D 27/33* | (2024.01) |
| *B64D 27/355* | (2024.01) |
| *F02C 9/40* | (2006.01) |
| *B64D 33/08* | (2006.01) |
| *B64D 41/00* | (2006.01) |
| *H01M 8/04014* | (2016.01) |
| *H01M 8/04082* | (2016.01) |
| *H01M 8/04089* | (2016.01) |
| *H01M 8/12* | (2016.01) |
| *H01M 8/1246* | (2016.01) |
| *H01M 8/2425* | (2016.01) |

(52) U.S. Cl.
CPC ............... *F02C 9/40* (2013.01); *B64D 33/08* (2013.01); *B64D 2041/005* (2013.01); *B64D 2221/00* (2013.01); *H01M 8/04014* (2013.01); *H01M 8/04089* (2013.01); *H01M 8/04201* (2013.01); *H01M 8/1246* (2013.01); *H01M 2008/1293* (2013.01); *H01M 8/2425* (2013.01); *H01M 2250/20* (2013.01); *H01M 2250/407* (2013.01); *Y02T 90/40* (2013.01)

(58) Field of Classification Search
CPC ......... B64D 2041/005; B64D 2221/00; H01M 8/04014; H01M 8/04089; H01M 8/04201; H01M 8/1246; H01M 8/2425; H01M 2008/1293; H01M 2250/20; H01M 2250/407; Y02T 90/40; Y02T 50/60
See application file for complete search history.

(56) References Cited

U.S. PATENT DOCUMENTS

| | | | |
|---|---|---|---|
| 6,834,831 | B2 | 12/2004 | Daggett |
| 7,966,830 | B2* | 6/2011 | Daggett ................ B64D 27/02 60/780 |
| 9,541,001 | B2 | 1/2017 | Steinwandel et al. |
| 10,314,209 | B2 | 6/2019 | Garriga et al. |
| 2003/0190506 | A1* | 10/2003 | Mueller ................ B60L 58/30 429/425 |
| 2006/0254255 | A1* | 11/2006 | Okai ..................... B64D 27/24 60/269 |
| 2014/0047814 | A1 | 2/2014 | Steinwandel et al. |
| 2015/0308383 | A1 | 10/2015 | Hoffjann et al. |
| 2019/0009917 | A1 | 1/2019 | Anton et al. |
| 2020/0194799 | A1* | 6/2020 | Hart ................ H01M 8/04022 |

OTHER PUBLICATIONS

PCT/US21/57781 International Search Report and Written Opinion dated Feb. 9, 2022.

Skilton, et al. Hydrogen Propulsion Project. Jun. 12, 2020 Mechanical Engineering Capstone Presentations. School of STEM ME Capstone Symposium. Available online at https://uwb-stem.github.io/Docs/Colloquium/ME-SPR20/Images/Hydrogen-Propulsion-Project/Hydrogen%20Propulsion%20Project%20Poster.pdf.

Waters, et al. Engine-integrated solid oxide fuel cells for efficient electrical power generation on aircraft. J Power Sources 284:588-605 (2015).

EP21889932.6 Extended European Search Report dated Oct. 11, 2024.

* cited by examiner

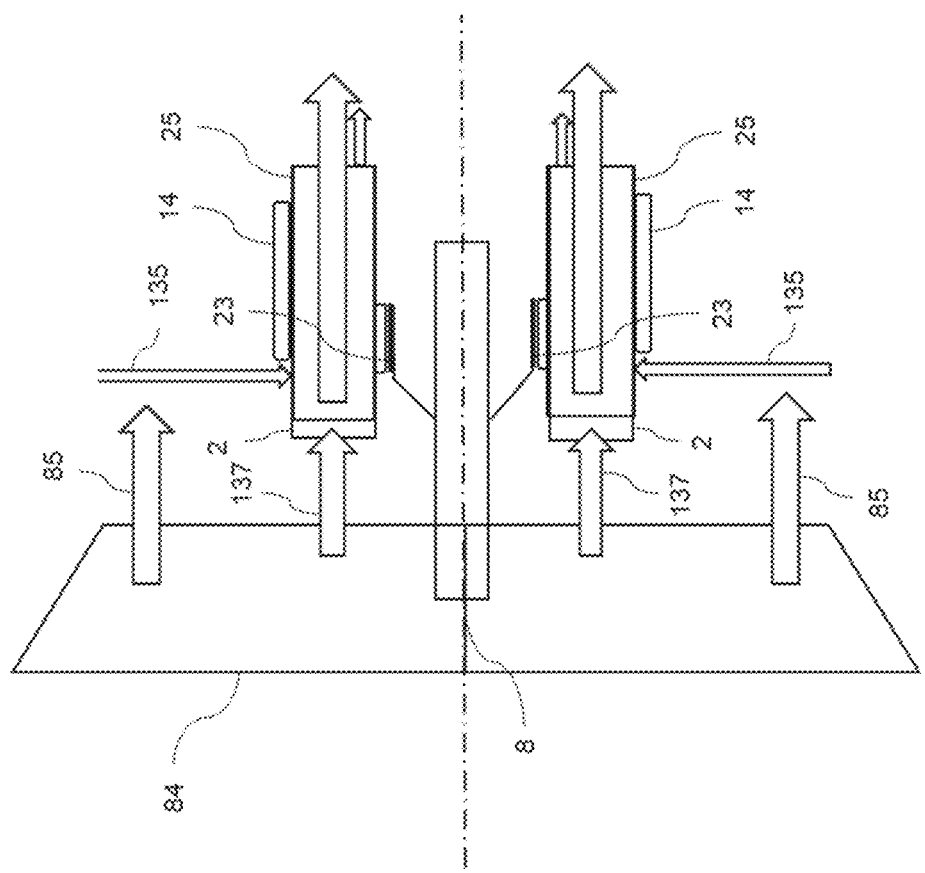

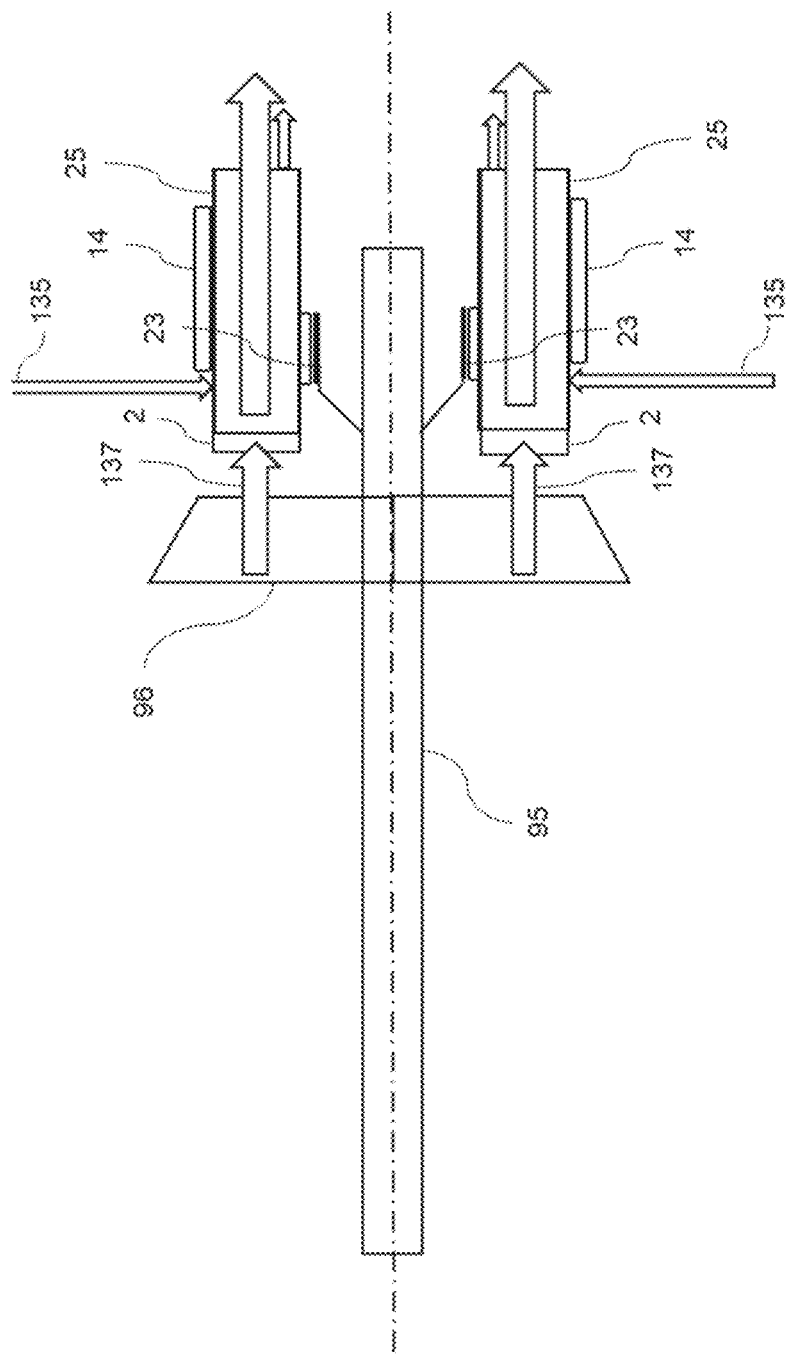

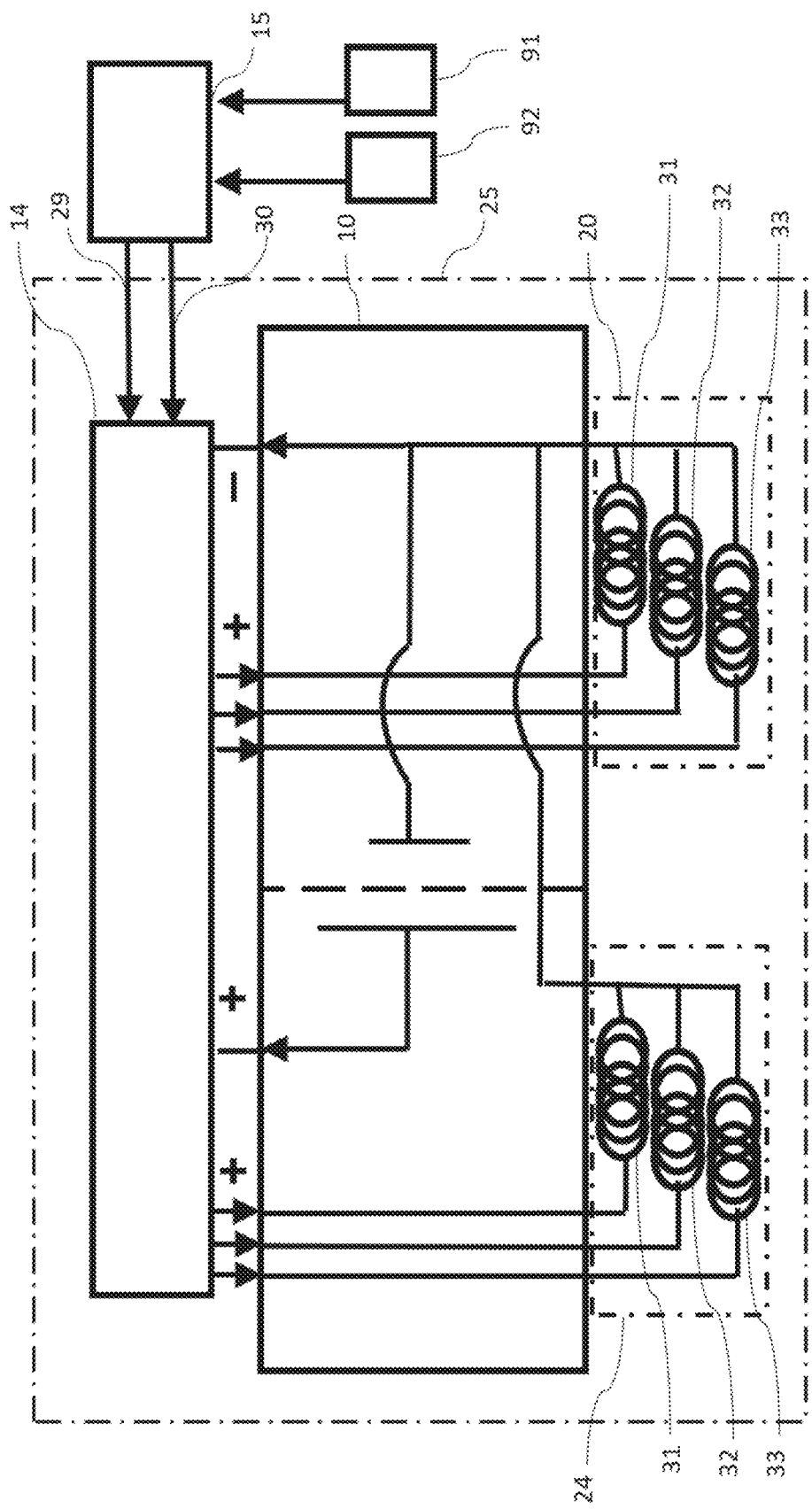

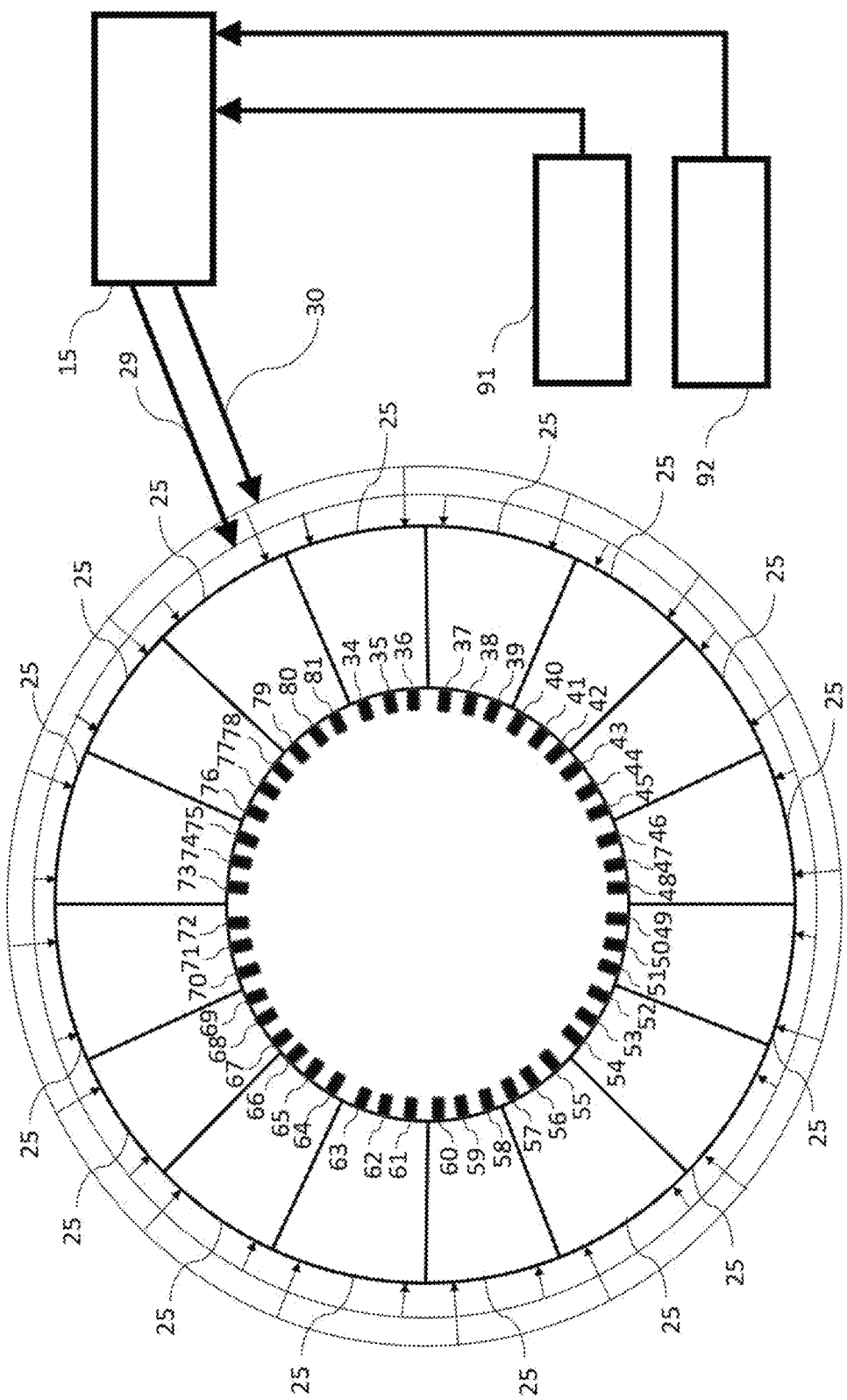

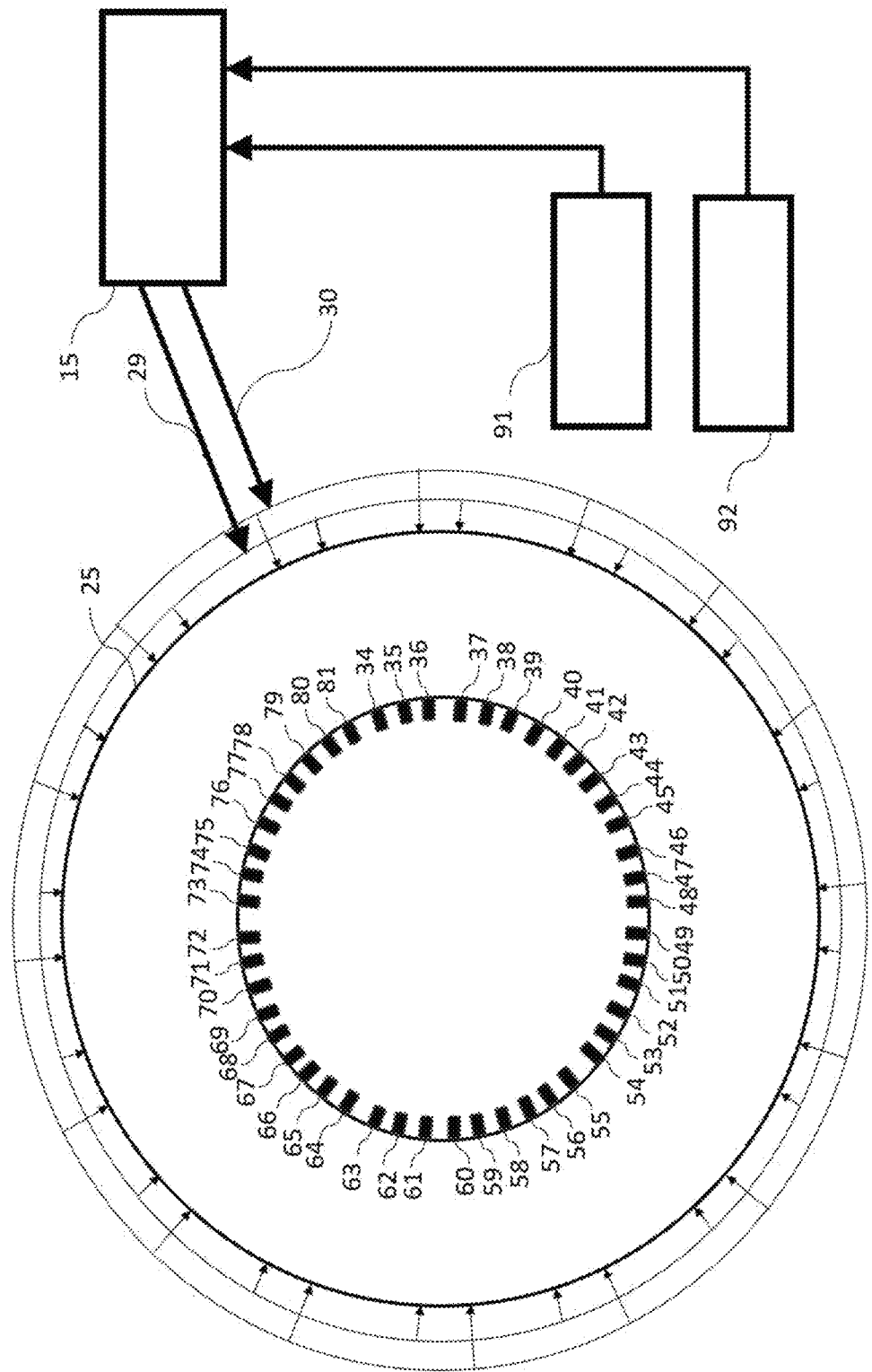

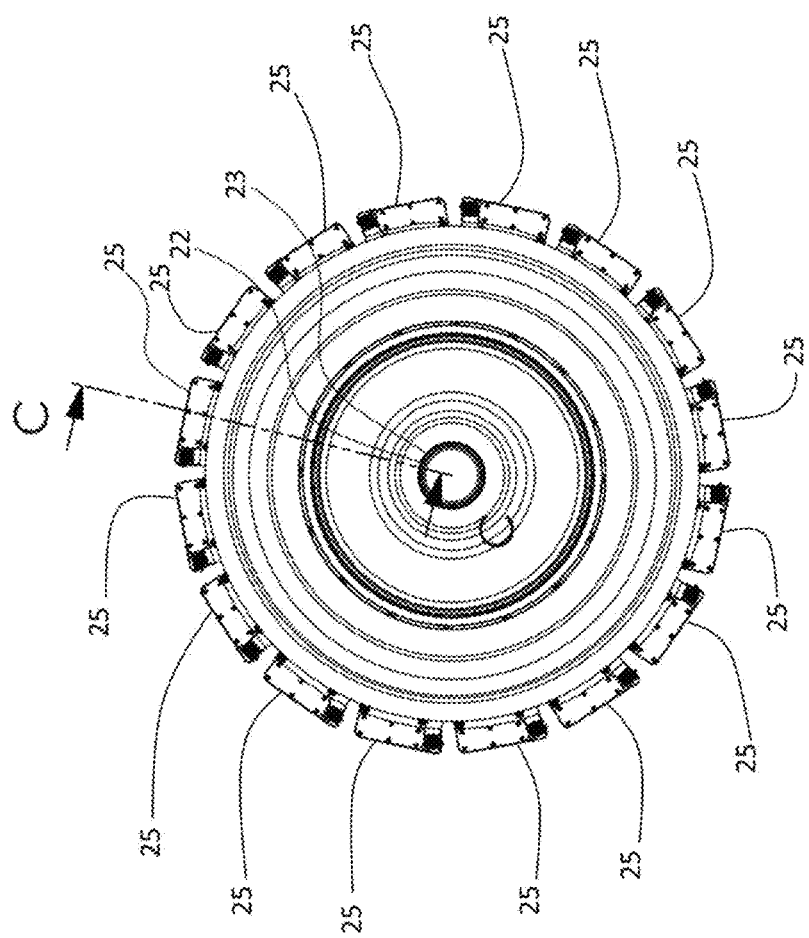

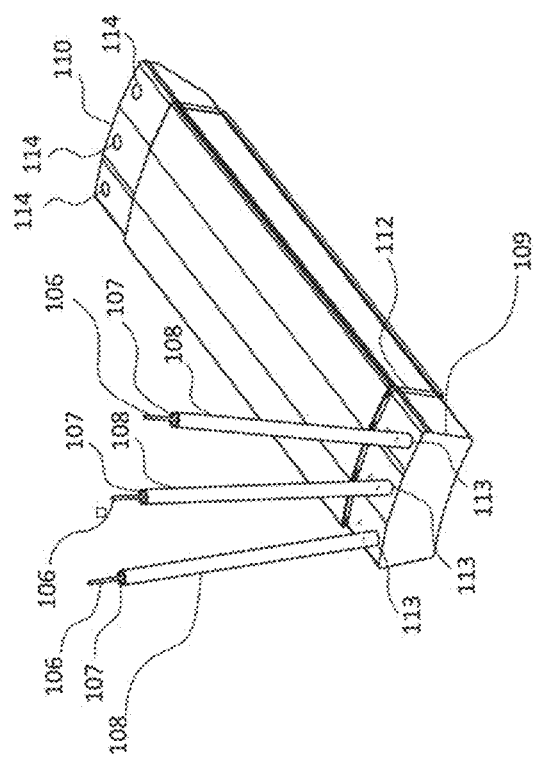

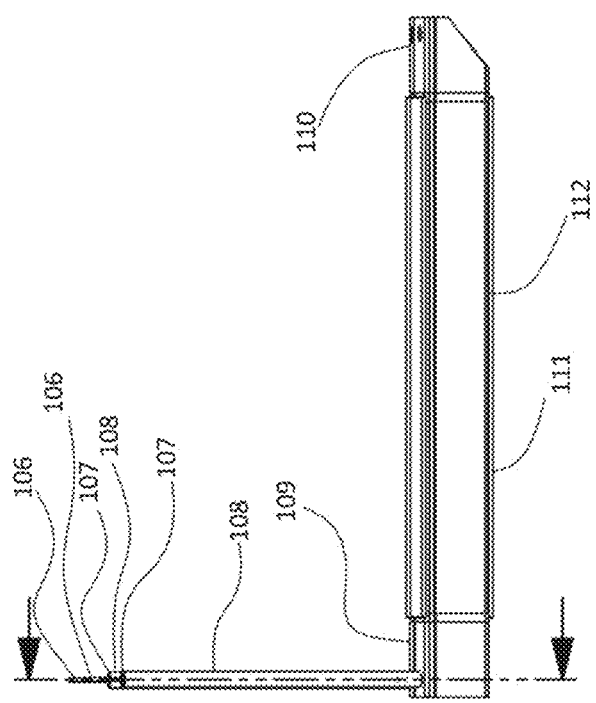

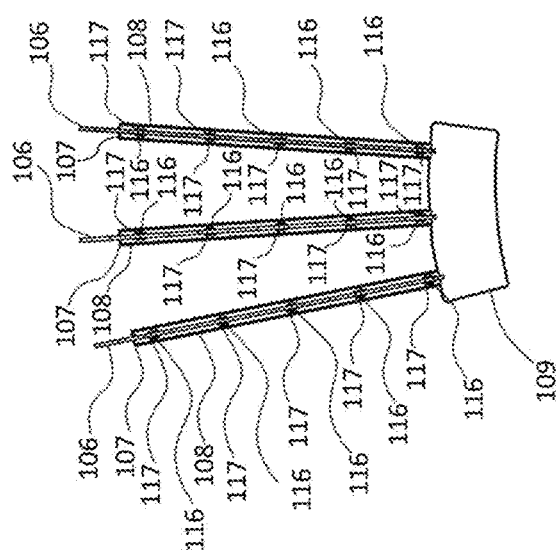

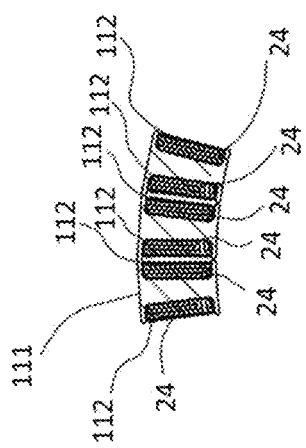

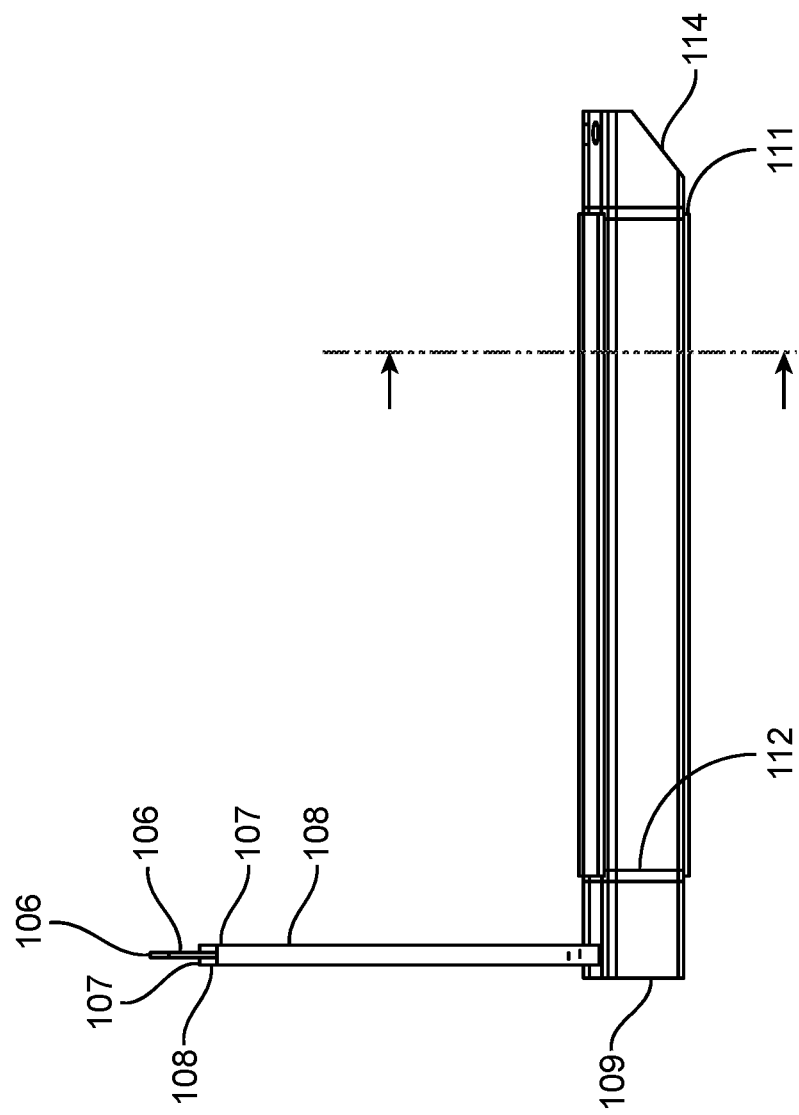

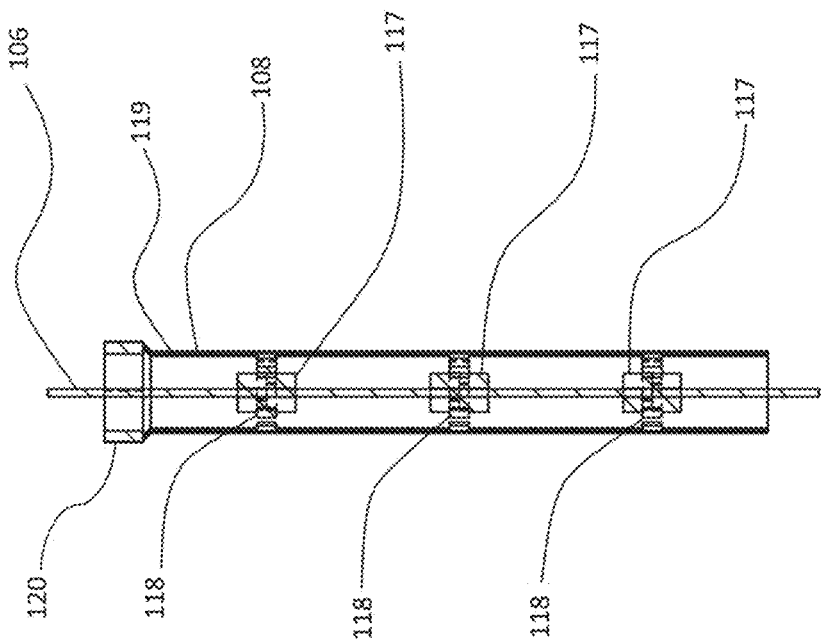

SYSTEMS AND METHODS FOR PROPULSION

CROSS-REFERENCE

This application is a continuation of International Patent Application PCT/US21/57781 filed on Nov. 2, 2021, which claims the benefit of and priority to U.S. Provisional Patent Application Ser. No. 63/108,887 filed on Nov. 3, 2020, each of which is incorporated herein by reference in its entirety for all purposes.

BACKGROUND

At present, one of the most important requirements when designing drive units is the minimization of their carbon footprints to achieve the most environmentally friendly and efficient operation. Large transport aircraft have long portions of their flight at high altitudes. Carbon release at or near ground level releases carbon at an altitude where natural mechanisms such as carbon capture from plants, oceans, lakes and streams can help clean the air of the carbon. The release of carbon at higher altitudes for extended periods of time, physically distanced from these naturally occurring carbon capturing mechanisms, increases the likelihood of larger amounts of carbon staying in the atmosphere for longer periods of time.

SUMMARY

Recognized herein are various limitations with propulsion systems currently available. The present disclosure addresses at least the abovementioned shortcomings of conventional propulsion systems that are currently available. Although there are currently battery powered aircraft, their relatively low power density has restricted their use to short range commuter and general aviation aircraft and have not been viable for large transport aircraft, industrial vehicles or other applications that rely on high energy density power units. Current designs being studied to address this problem have used a fuel as a stored energy source, a separate device to convert the chemical energy in the fuel to electrical energy, one or more electric motors to convert the electrical energy into mechanical energy to turn one or more shafts and a high power electrical transmission system to transfer the large amounts of electrical energy to one or more electric motor. The transmission of large amounts of electrical power requires large conductors, which results in power loss in the form of heat, and requires thermal management of the heat associated with the power loss during transmission.

The present application relates generally to propulsion systems and, more particularly, to carbon free propulsion systems. The present disclosure also relates to means for providing hydrogen and/or electrical power to a drive unit and the application of such a drive unit to power or propel a machine or vehicle.

In one aspect, the present disclosure provides propulsion systems for carbon free transport and methods for using such propulsion systems for carbon free transport.

In some embodiments, the system may comprise one or more motor assemblies for driving at least one shaft or rotor of a vehicle. The one or more motor assemblies may comprise one or more motor windings and one or more magnets. The system may further comprise one or more fuel cells in fluid communication with the one or more motor assemblies. In some embodiments, the one or more fuel cells may comprise a solid oxide fuel cell or a segmented solid oxide fuel cell. In some embodiments, the one or more fuel cells may be segmented to independently power different motor windings of the one or more motor windings. In some embodiments, the one or more fuel cells may be arranged in a circular configuration. In some embodiments, the one or more fuel cells may be configured to generate direct current electrical energy from a fuel that is directed through a portion of the one or more motor assemblies to (i) cool the one or more motor windings and the one or more magnets and (ii) and heat the fuel before the fuel enters the one or more fuel cells. The system may further comprise a combustion chamber in fluid communication with the one or more fuel cells. In some embodiments, the combustion chamber may comprise an annular volume. In some embodiments, the combustion chamber may be configured to combust an exhaust flow from the one or more fuel cells to (i) react unused hydrogen exhausted from the one or more fuel cells and (ii) provide thermal and/or mechanical power. In some embodiments, the exhaust flow from the fuel cells comprises at least a portion of the fuel. In some embodiments, the fuel may comprise hydrogen in a liquid phase and/or a gas phase.

In some embodiments, the system may comprise one or more electrical conductors for transmitting the electrical energy generated by the one or more fuel cells to an electrical load. In some embodiments, the electrical load comprises the motor windings. In some embodiments, the one or more electrical conductors may be in thermal communication with the fuel to enable a transfer of thermal energy between the one or more electrical conductors and the fuel. In some embodiments, the one or more electrical conductors are configured to heat the fuel before the fuel enters the one or more fuel cells or the one or more motor assemblies.

In some embodiments, the system may comprise a transfer device for transporting the electrical energy and the fuel. The transfer device may comprise the one or more electrical conductors and a pressure vessel for transporting the fuel to the motor assemblies and/or the fuel cells. In some embodiments, the electrical conductors are routed through an interior region or inner volume of the pressure vessel. In some embodiments, the transfer device is fluidically connected to (i) a cooling shroud providing access to the one or more motoring windings and/or (ii) an interior region of the one or more motor assemblies in which the one or more magnets are positioned.

In some embodiments, the one or more motor windings and the one or more magnets may be in thermal communication with the fuel to enable a transfer of thermal energy between (i) the one or more motor windings and the one or more magnets and (ii) the fuel. In some embodiments, the one or more motor windings and the one or more magnets may be configured to heat the fuel before the fuel enters the one or more fuel cells. In some embodiments, the one or more fuel cells may be in fluid and/or thermal communication with a stream of air that (i) cools the one or more fuel cells via convection and (ii) flows to the combustion chamber to (a) cool the combustion chamber and/or (b) facilitate combustion of the fuel.

In some embodiments, the system may comprise a controller configured to control a distribution of power between a first motor winding and a second motor winding of the one or more motor windings, based at least in part on one or more timing signals. In some embodiments, the system may comprise a timing controller configured to generate the one or more timing signals. The one or more timing signals may convey information on a position and speed of the at least one shaft or rotor. In some embodiments, the controller may be configured to monitor and control one or more parameters of a current provided to the one or more motor windings. The one or more parameters may comprise an alternating current timing or an amount of current. In some embodiments, the controller may be configured to adjust a current provided to the one or more motor windings to adjust or optimize a rotational speed of the at least one shaft or rotor based on a flight profile of the vehicle.

In some embodiments, the system may further comprise a fuel reformer that is located upstream of the one or more fuel cells. The fuel reformer may be configured to convert the fuel from a liquid phase to a gas phase. In some embodiments, the system may comprise one or more direct current to alternating current inverters and electronic commutators in electrical communication with the one or more motor assemblies. The one or more direct current to alternating current inverters and electronic commutators may be configured to convert the direct current electrical energy generated by the one or more fuel cells into alternating current electrical energy to power the one or more motor windings to produce electrical torque for driving the at least one shaft or rotor to produce mechanical power. In some embodiments, the system may comprise one or more cooling fins in thermal communication with the motor assemblies and exhaust air to allow a transfer of thermal energy produced by the fuel cells or the motor assemblies to the exhaust air to provide thermal power and to accelerate the exhaust air.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference. To the extent publications and patents or patent applications incorporated by reference contradict the disclosure contained in the specification, the specification is intended to supersede and/or take precedence over any such contradictory material.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" and "FIG." herein), of which:

FIG. 1D shows a schematic side view of the drive unit without a high-pressure compressor or combustor, according to an embodiment of the invention.

FIG. 1E shows a schematic side view of the drive unit without a high-pressure compressor or combustor and with a general purpose output shaft, according to an embodiment of the invention.

FIG. 6A is an electrical schematic showing the fuel cell motor assembly and master control unit according to an embodiment of the invention.

FIG. 7A schematically illustrates an embodiment of the invention showing the fuel cell motor assemblies and the interconnection of the controller.

FIG. 7B schematically illustrates an embodiment of the invention showing a single circumferential fuel cell motor assembly and the interconnection of the controller.

FIG. 9A schematically illustrates a front end view of a drive unit according to an embodiment of the invention.

FIG. 10 schematically illustrates an isometric view of a motor winding cooling shroud connected to cylindrical pressure vessels according to an embodiment of the invention.

FIG. 11A shows a side view of the motor winding cooling shroud connected to cylindrical pressure vessels according to an embodiment of the invention.

FIG. 11B shows a cross-section of the cylindrical pressure vessel and hydrogen and electrical power conductor transfer device according to an embodiment of the invention.

FIG. 12A shows a side view of the motor winding cooling shroud connected to cylindrical pressure vessels according to an embodiment of the invention.

FIG. 12B shows a cross-section of the axial transfer section, stator and windings according to an embodiment of the invention.

FIG. 14B shows a cross-section of the cylindrical pressure vessel, hydrogen and electric power conductor transfer device, isolator and centering arms according to an embodiment of the invention.

DETAILED DESCRIPTION

Figure 1A:
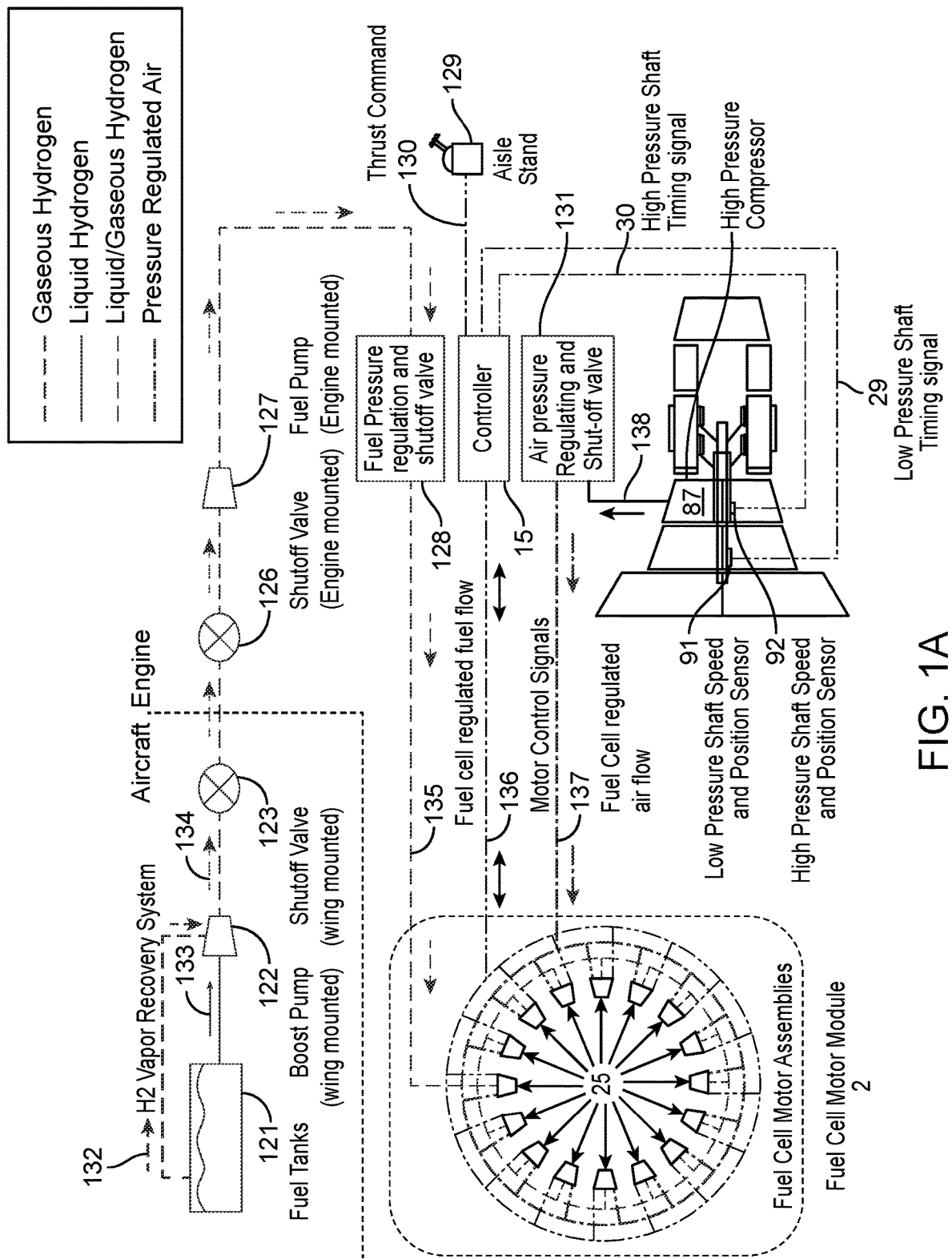
FIG. 1A schematically illustrate an exemplary system for carbon free propulsion.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) that is performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

In one aspect, the present disclosure provides a propulsion system. The propulsion system may comprise a drive unit with integrated fuel cells, motor windings and controllers, and rotor assemblies for producing electrical, thermal and/or mechanical power. The propulsion system may be implemented to enable efficient and safe carbon free propulsion for machines such as, for example, large transport aircraft. The integration configuration for the drive unit may allow for the transmission of high voltage currents using smaller diameter electrical conductors, thereby reducing a power loss via the conductors and consequently minimizing the volume of hydrogen needed within the drive unit to cool various components of the drive unit during operation. In some cases, the electrical conductors may comprise a diameter. The diameter may range from about 0.5 millimeters (mm) to about 5 mm. In some cases, the diameter may be less than or equal to 0.5 mm. In some cases, the diameter may be greater than or equal to 5 mm. In some cases, the electrical conductors may comprise, for example, a copper magnet wire. The copper magnet wire may be, in some non-limiting embodiments, 10 AWG copper magnet wire. The copper magnet wire may be surrounded by hydrogen for cooling and to increase the dielectric withstand voltage as compared to air. This wire may be used for (a) the short distance from (i) the top of the motor assembly where the DC to AC conversion takes place and (ii) the bottom of the motor assembly where the coils are located and (b) the coils themselves. In some cases, copper bus bars may be used to establish electric connections between the electronics and the SOFC and/or the electronics and the magnet wire terminals.

In one embodiment, the system may comprise one or more motor assemblies for driving at least one shaft or rotor of a vehicle. The one or more motor assemblies may comprise one or more motor windings and one or more magnets.

In some cases, the system may further comprise one or more fuel cells in fluid communication with the one or more motor assemblies. The one or more fuel cells may be configured to generate direct current electrical energy from a fuel that is directed through a portion of the one or more motor assemblies to (i) cool the one or more motor windings and the one or more magnets and (ii) and heat the fuel before the fuel enters the one or more fuel cells.

In some cases, the system may further comprise a combustion chamber in fluid communication with the one or more fuel cells. The combustion chamber may be configured to combust an exhaust flow from the one or more fuel cells to (i) fully react unused hydrogen exhausted from the one or more fuel cells and (ii) provide thermal and/or mechanical power.

In some embodiments, the propulsion system may comprise one or more fuel cells (e.g., one or more solid oxide fuel cells) and a hydrogen combustion sub-system. The SOFCs and the hydrogen combustion sub-system may be used in combination for takeoff and climb maneuvers. For cruise and descent maneuvers, the hydrogen combustion sub-system may be limited to essential pilot fuel nozzle operations, with the majority of power being generated by the SOFCs.

FIG. 1A schematically illustrates an example of a system for carbon-free propulsion. The system may comprise one or more fuel tanks 121 in fluid communication with one or more fuel cell motor assemblies 25 of a fuel cell motor module 2. The one or more fuel tanks may be configured to provide the fuel to the one or more motor assemblies to heat the fuel and to cool the motor assemblies before the fuel is directed to one or more fuel cells.

In some cases, the system may comprise one or more pumps and/or one or more valves for controlling a flow of fuel from the fuel tanks to the motor assemblies. The one or more pumps may comprise, for example, a boost pump 122. The boost pump may be mounted to a wing of an aircraft. The one or more pumps may comprise, for example, a fuel pump 127. The fuel pump may be mounted to an engine of an aircraft. The one or more valves may comprise, for example, one or more shutoff valves 126. The one or more shutoff valves may be mounted to a wing of an aircraft and/or an engine of the aircraft.

In some cases, the system may comprise one or more valves for controlling a flow of air from the engine high- or low-pressure air compressor to the motor assemblies. The one or more valves may comprise, for example, a pressure regulating and shut-off valve. The air pressure regulating and shut-off valve may be mounted to an engine of an aircraft. The pressure regulating and shut-off valve may be mounted in any orientation relative to the engine. In some non-limiting embodiments, the air pressure regulating and shut-off valve may not or need not be mounted to an engine of an aircraft, and may be mounted to any other structural component that is adjacent or proximal to the engine of the aircraft.

As shown in FIG. 1A, gaseous hydrogen 132 may be provided from the fuel tanks 121 to a boost pump 122. In some cases, the gaseous hydrogen 132 may be routed through a hydrogen vapor recovery system before arriving at the boost pump 122. In some cases, liquid hydrogen 133 may be provided from the fuel tanks 121 to the boost pump 122. In some cases, a mixture of liquid and gaseous hydrogen 134 may be directed from the boost pump 122 to one or more shutoff valves 123, 126 and the fuel pump 127.

In some instances, the fuel pump 127 may be in fluid communication with a fuel pressure regulation and shutoff valve 128. The fuel pressure regulation and shutoff valve 128 may be configured to direct a regulated fuel flow 135 to the fuel cell motor assemblies. The regulated fuel flow 135 may comprise liquid hydrogen and/or gaseous hydrogen provided from the fuel pump 127 via the fuel pressure regulation and shutoff valve 128.

In some embodiments, the fuel pressure regulation and shutoff valve 128 may be operatively coupled to a controller 15. The controller 15 may be configured to modulate an operation of the fuel pressure regulation and shutoff valve 128 based on one or more thrust commands 130 provided by an operator (e.g., via an aisle stand 129 of the aircraft). In some cases, the controller 15 may be configured to control an amount of current provided to the fuel pressure regulation and shutoff valve 128 to open and/or close the fuel pressure regulation and shutoff valve 128, or to adjust a degree of opening or closing of the fuel pressure regulation and shutoff valve 128. The controller 15 may also be operatively coupled to the fuel cell motor assemblies to provide one or more motor control signals 136 to the fuel cell motor assemblies.

In some embodiments, the controller 15 may be operatively coupled to an air pressure regulating and shut-off valve 131. The air pressure regulating and shut-off valve 131 may be configured to control or regulate an amount of air flow 137 provided to the fuel cell motor assemblies. The air flow 137 may comprise air flow from a high pressure compressor 87 as described elsewhere herein. In some cases, the controller 15 may be configured to control an amount of current provided to the air pressure regulating and shut-off valve 131 to open and/or close the air pressure regulating and shut-off valve 131, or to adjust a degree of opening or closing of the air pressure regulating and shut-off valve 131.

The one or more fuel tanks may comprise a fuel. The fuel may comprise, for example, hydrogen. The hydrogen may comprise liquid hydrogen. In some embodiments, the liquid hydrogen may be stored at a pressure ranging from about 14.7 psia to about 25 psia. In some embodiments, the liquid hydrogen may be stored at a temperature ranging from about −300 degrees Celsius to about −252 degrees Celsius and a pressure of about 1.103 bars or 14.7 psia. In some non-limiting embodiments, the fuel may comprise any compound comprising hydrogen (e.g., ammonia or a hydrocarbon). The compound may be any hydrogen carrier. In some cases, any gaseous hydrogen that boils in the tank may be sent through a pump mixed with the liquid hydrogen flow to the engine in a 2 phase mixture when the engine is running to use in the fuel cells. In instances where the engines are not running, the gaseous hydrogen may be vented as needed to keep tank pressures within proof and burst limits.

Hydrogen has high thermal capacity and can withstand a higher electrical potential gradient before arcing when compared to air. This allows for (i) more heat transfer between an electrical conductor and the hydrogen and (ii) higher voltages in the electrical conductor before arcing occurs. This high heat capacity and the ability to withstand higher electrical potentials before arcing also makes hydrogen an excellent coolant for the one or more motor windings and rotor permanent magnets disclosed herein.

As described above, the propulsion system may comprise one or more motor assemblies. The one or more motor assemblies may comprise one or more motor windings and/or one or more magnets for driving at least one shaft or rotor of a vehicle. The one or more motor assemblies may be configured to generate mechanical energy from electrical energy. In some cases, the one or more motor assemblies may be configured to drive the at least one shaft or rotor based on an electrical current that is supplied to the motor windings and/or an electric field or a magnetic field that is generated or induced by the magnets and/or the current flowing through the windings. The one or more motor assemblies may be configured to generate force in the form of a torque applied to the at least one shaft or rotor based on an electric field and/or a magnetic field that is generated or induced by the magnets and/or the current flowing through the windings. The one or more motor assemblies may be powered by direct current (DC) sources, such as from batteries, or rectifiers, or by alternating current (AC) sources. In some embodiments, the one or more motor assemblies may be powered by electrical energy that is generated using one or more fuel cells.

As shown in FIG. 4, FIG. 5, and FIGS. 6A-6C, in some embodiments, the fuel cell motor assemblies may comprise at least two sets of windings. The at least two sets of windings may comprise, for example, Low Pressure Shaft Motor Winding 20, and High Low Pressure Shaft Motor Winding 24. The Low Pressure Shaft Motor Winding 20 and/or the High Low Pressure Shaft Motor Winding 24 may comprise one or more motor windings. The one or more motor windings may comprise, for example, Phase A Coil 31, Phase B Coil 32, and Phase C Coil 33, for each of the Fuel Cell Motor Assemblies 25. Each of the Fuel Cell Motor Assemblies 25 may also comprise a Fuel Cell Stack Power Distribution Controller and Electronic Commutator 14 (see for example FIGS. 1B-1E) which converts the direct current supplied by the fuel cell stack 10 to alternating current and supplies the alternating current to the Low Pressure Shaft Motor Winding 20, Phase A Coil 31, Phase B Coil 32, Phase C Coil 33 and High Low Pressure Shaft Motor Winding 24, Phase A Coil 31, Phase B Coil 32, Phase C Coil 33.

The integrated nature of the fuel cell motor assemblies 25 may allow the drive unit to take in fuel, convert the fuel into direct current electricity, and convert the direct current electricity to alternating current electricity to be used in the coils to turn the shafts without external transmission of power to or from the drive unit.

In some cases, the one or more motor windings and the one or more magnets may be in thermal communication with the fuel to enable a transfer of thermal energy between (i) the one or more motor windings and/or the one or more magnets and (ii) the fuel. In such cases, the one or more motor windings and/or the one or more magnets may be configured to heat the fuel before the fuel enters one or more fuel cells.

In some cases, the fuel provided to the one or more motor assemblies may comprise liquid hydrogen. The liquid hydrogen may be used to cool the motor windings and/or magnets of the one or more motor assemblies. The cooling of the motor windings and/or the magnets may involve a transfer of thermal energy between (i) the motor windings and/or magnets and (ii) the liquid hydrogen flowing through the one or more motor assemblies. The transfer of thermal energy may heat the liquid hydrogen, thereby inducing a phase change or a state change. The phase change or state change may cause the liquid hydrogen to transition to gaseous hydrogen.

In some embodiments, the gaseous hydrogen may be provided or directed to a fuel control unit. The fuel control unit may be configured to direct at least a portion of the gaseous hydrogen to (i) one or more fuel cells for processing of the hydrogen to generate electrical energy and/or (ii) a combustion chamber for combustion of the gaseous hydrogen. In some cases, the gaseous hydrogen may flow through a fuel cooled oil cooler to facilitate a transfer of thermal energy between the fuel (i.e., the hydrogen) and a flow of oil. The oil may be used to lubricate one or more components of the one or more motor assemblies or one or more components mechanically coupled to the at least one shaft or rotor of the vehicle.

In some preferred embodiments, the system may not or need not comprise a fuel/oil heat exchanger. In such cases, the phase change for the hydrogen may not occur until the hydrogen picks up heat from the wiring, and the fuel metering unit may be configured to work/operate primarily with liquid hydrogen. In some non-limiting cases, however, the fuel metering unit may be configured to work/operate with a two phase flow of hydrogen (i.e., a flow of hydrogen comprising both liquid and gaseous hydrogen).

As described above, in some cases, the motor assemblies may comprise one or more magnets. The one or more magnets may be disposed on at least one shaft or rotor of the motor assemblies.

In some cases, the one or more magnets may comprise one or more permanent magnets. The one or more permanent magnets may comprise material that is magnetized and creates its own persistent magnetic field without the need for any external source of magnetism or electrical power.

Figure 9B:
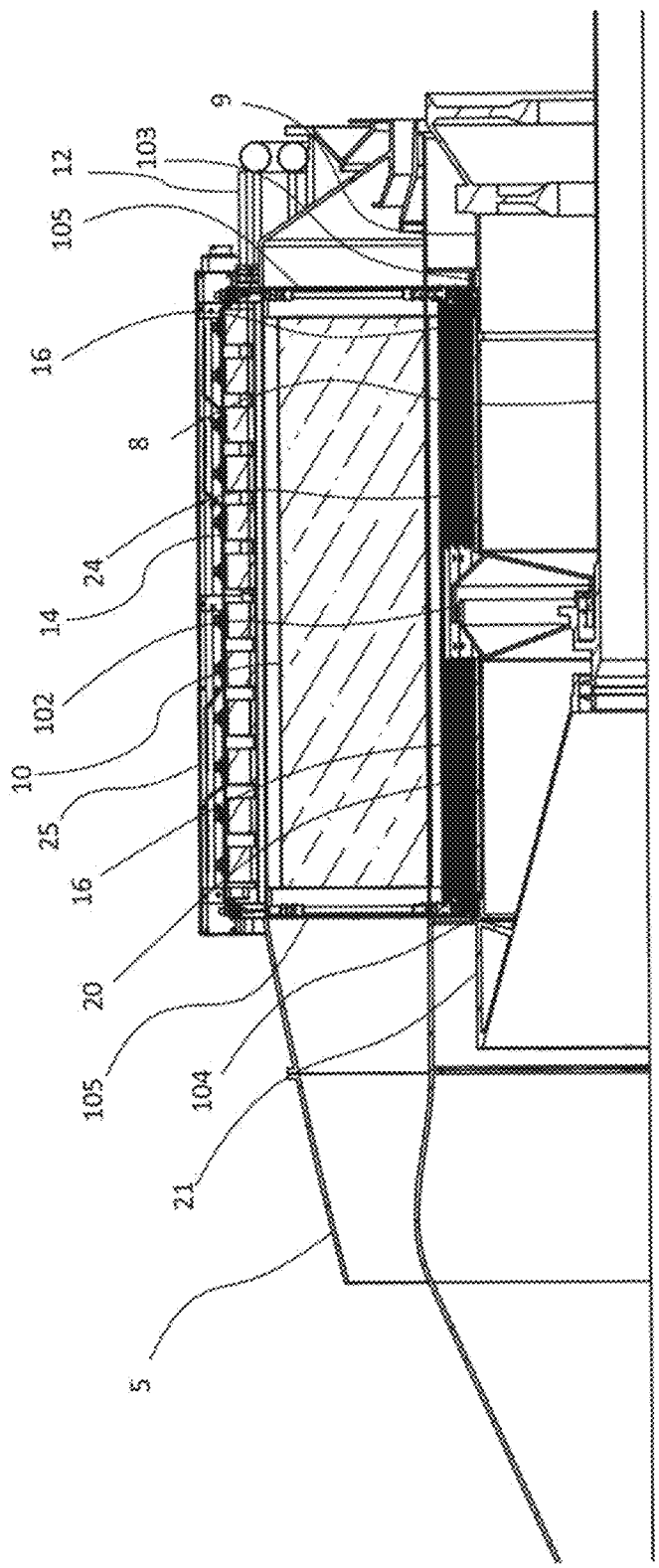
FIG. 9B schematically illustrates a cross-sectional view of FIG. 9A, detailing an embodiment with rotating seals, the fuel cell motor assembly, and the master control unit.

Referring to FIG. 9B, in some cases, the fuel cell motor assemblies may comprise an annular volume containing the Low Pressure Shaft Motor Winding 20 and the high Pressure Shaft Motor Winding 24, Permanent Magnets 16 and enclosed by a High Pressure Shaft to Fixed Structure Rotating Hydrogen Seal 103, High Pressure Shaft Segment 9, Inter-Shaft Rotating Hydrogen Seal 102, Low Pressure Shaft Segment 8, Low Pressure Shaft to Fixed Structure Rotating Hydrogen Seal 104, and the inner most radial portion of the Fuel Cell Motor Assemblies 25.

In some cases, the annular volume may comprise a high pressure shaft to fixed structure hydrogen seal, a high pressure shaft segment, a low pressure to high pressure shaft inter-shaft hydrogen seal, a low pressure shaft segment, and a low pressure shaft to fixed structure hydrogen seal. The annular volume may be in fluid communication with the one or more motor assemblies via one or more hydrogen inlets disposed on a radially innermost side of the motor assemblies. The annular volume may also be fluidically connected to an outlet of a hydrogen and electrical power conductor transfer device (described in greater detail below) to receive fuel (e.g., hydrogen fuel from the one or more fuel tanks).

In some cases, hydrogen may flow axially through the annular volume into the one or more motor assemblies in fluid communication with the annular volume. The hydrogen may flow over the permanent magnets attached to one or more high and low pressure shafts to convectively cool the magnets and simultaneously heat the hydrogen. The hydrogen may also flow over and/or through the motor windings to convectively cool the windings and to convectively heat the hydrogen. The heated hydrogen may exit the motor assemblies via one or more outlets in fluid communication with one or more fuel cells.

Because hydrogen is a flammable fluid when in gaseous form and could potentially pose a hazard to the machine if a large volume of hydrogen where to ignite, there is a strong desire to minimize the volume of hydrogen within the drive device at any given time. Minimizing the volume of hydrogen used for cooling the windings is accomplished by directly flowing the hydrogen into cooling shrouds which fit closely over each set of windings and fit over each stator. Each set of three windings are connected to a collection manifold at the entrance to the winding set and allow the hydrogen to flow through each set of windings where it to collected in a manifold and then directed into the fuel cell to create electrical and thermal power.

In some cases, the hydrogen may cool the windings before entering the fuel cell, to minimize the need for additional hydrogen and/or to obviate the need for a separate loop for cooling other components of the drive unit using hydrogen.

If cooling of the permanent magnets is also required, one or more cooling manifolds of the drive unit may be replaced by a set of rotating hydrogen seals that form a seal between the high pressure shaft and fixed structure, an inter-shaft seal that forms a seal between the high and low pressure shafts and the low pressure shaft and fixed structure. These seals may be placed radially close to the bottom of the fuel cell assembly to create an annular volume where hydrogen may enter the volume, travel through the volume occupied by the windings and permanent magnets, and then exit the volume and enter the fuel cell cavity.

Because the fuel cells need gaseous hydrogen to operate properly, it may be necessary to convert the hydrogen into gaseous hydrogen before entering the fuel cell (if cryogenic liquid hydrogen is to be stored/used). The heat transfer between the electrical conductors, the windings and the permanent magnets may provide a mechanism to change the liquid hydrogen into gaseous hydrogen needed for the fuel cells.

With the use of liquid hydrogen, the cryogenic temperature of the fuel can be used to cool the motor windings and power transfer components of or within the fuel cell motor assembly to allow for higher current flow via smaller coil wire sizes, thereby decreasing the weight and increasing the efficiency and power capacity of the drive unit. The use of liquid hydrogen as a fuel may also reduce the pressure required to store the hydrogen in the vehicle storage tanks and to route/transfer the hydrogen through various fuel feeds.

Figure 1B:
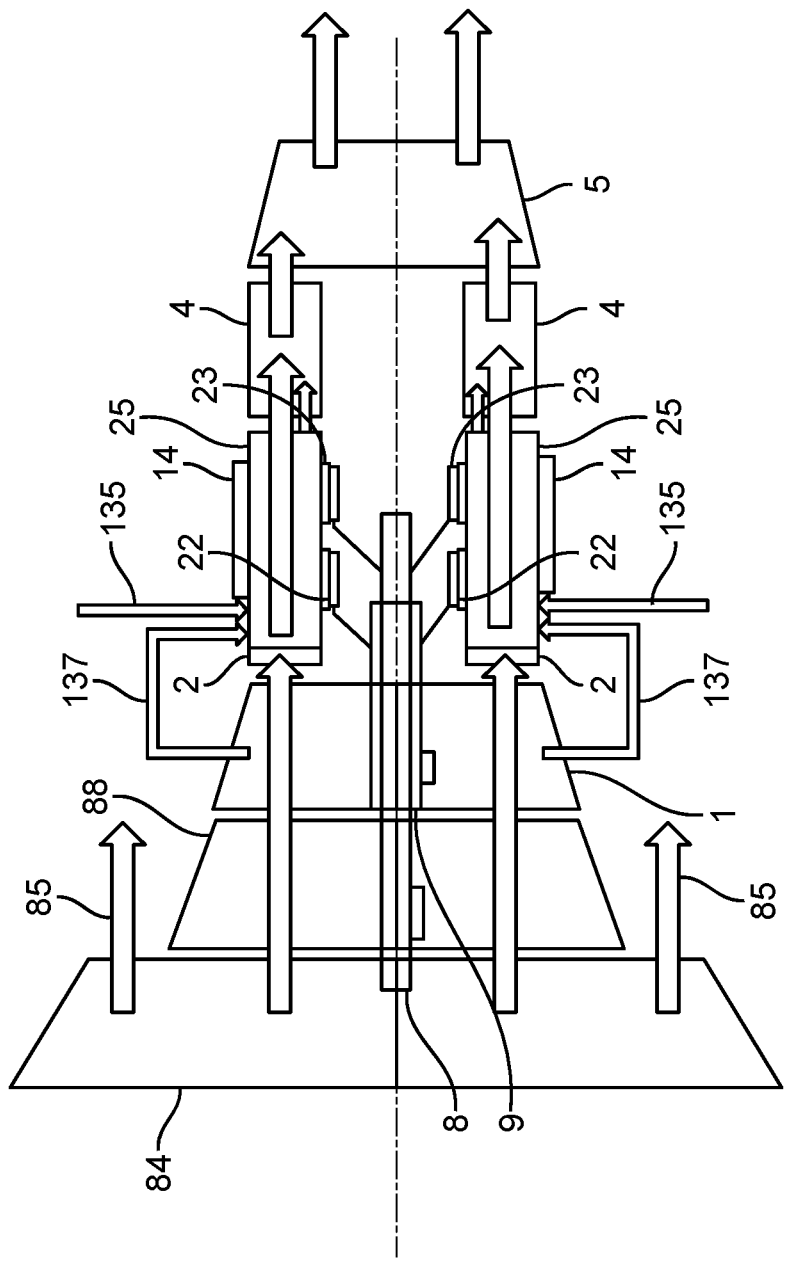
FIG. 1B schematically illustrates an example of a drive unit.

FIG. 1B schematically illustrates a system comprising a Drive Unit 83 configured to provide thrust to an aircraft as a turbofan engine. In some embodiments, the Drive Unit 83 may be modified by eliminating the turbines and adding an integrated Fuel Cell Motor Assembly 25 and associated rotor assemblies 22 and 23. To generate thrust as a turbofan engine, the Drive Unit 83 may comprise a Low Stage Compressor Fan 84, a Low Stage Compressor Unit 88 and a high stage Compressor 1 which may be connected to Low Pressure Shaft 8 and High Pressure Shaft 9 concentric shafts and arranged to provide serial airflow from the low stage compressor to the high stage compressor. In some embodiments, the airflow may be directed from the compressor 1 to the fuel cell motor module 2, where the low stage compressor fan discharge air flows through the gaps between a plurality of fuel cell motor assemblies 25 arranged circumferentially about an axis. The Bypass Air flow 85 may be utilized in any of the embodiments described herein, but may not or need not be required if the drive unit is used for other applications requiring only rotation of a drive shaft such as, for example, automobiles, ships or fixed, stationary power devices. As described elsewhere herein, pressure regulated airflow may be provided from the high stage Compressor 1 to one or more Fuel Cell Motor Assemblies 25 via a Regulated Air Inlet 11, and pressure regulated fuel may be provided from the Aircraft Fuel Tank to the Fuel Cell Motor Assemblies 25 via a Regulated Hydrogen Inlet 12. As described elsewhere herein, a Fuel Cell Stack Power Distribution Controller and Electronic Commutator 14 may be used to (i) convert direct current supplied by one or more fuel cell stacks to alternating current and (ii) supply the alternating current to one or more motor windings.

Figure 3:
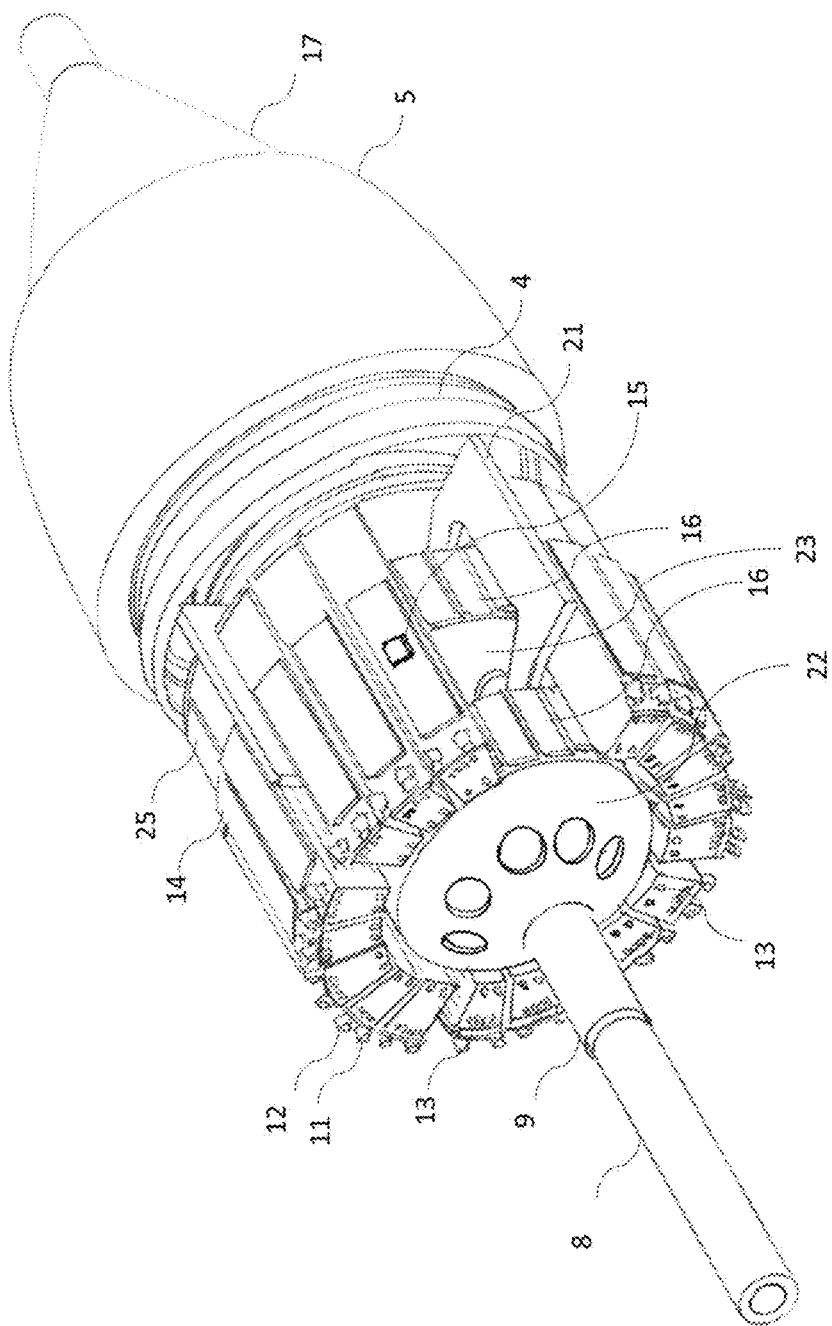
FIG. 3 is an isometric view showing the arrangement of the fuel cell motor assemblies and the combustion chamber and nozzle, in accordance with some embodiments.

Following the airflow through the Drive Unit 83, as indicated by the arrows in FIG. 1B, after the air leaves the high stage Compressor 1, the airflow in standard turbofan engines would normally enter a combustion chamber. In the embodiments described herein, the airflow may enter the Fuel Cell Motor Chambers 2, where the high pressure compressor discharge air flows through the gaps between the sixteen Fuel Cell Motor Assemblies 25 arranged circumferentially as shown in FIG. 3 as well as through the fuel cell stack bypass holes 13 shown in FIG. 4 and FIG. 5. The high stage Compressor 1 discharge airflow may not or need not enter the fuel cells, and may provide cooling and heat transfer using the Cooling Fins 18 and Fuel Cell Stack Bypass 13. The airflow may then enter an Annular Combustion Chamber 4 where it provides air for cooling the chamber walls and air to support combustion within the chamber. The airflow may then flow out the rear of the Annular Combustion Chamber 4 and may be exhausted out the Engine Exhaust Nozzle 5.

In some embodiments, two rotor assemblies, High Pressure Rotor 22 and Low-Pressure Rotor 23, both containing alternating positive and negative polarity permanent magnets 16, may be attached to the High-Pressure Shaft 9 and Low-Pressure Shaft 8 respectively, as shown in FIG. 1B and FIG. 3. In some embodiments, the Fuel Cell Motor Assemblies 25 may be arranged in a circular configuration (i.e., circumferentially at a fixed or variable distance relative to the High-Pressure Shaft 9 and Low-Pressure Shaft 8). In some embodiments, the systems disclosed herein may further comprise a bearing support 21 and an engine exhaust plug 17, as illustrated in FIG. 3.

Figure 1C:
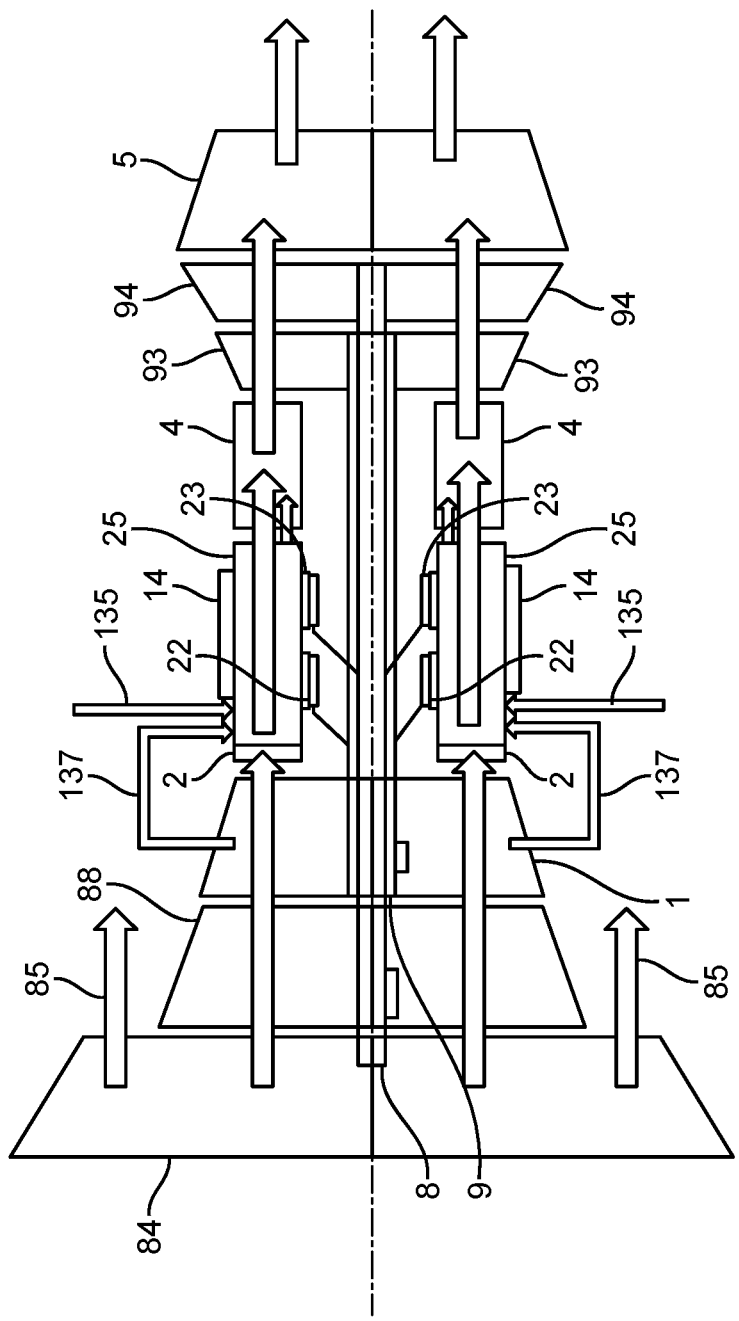
FIG. 1C shows a schematic side view of the drive unit with turbine units, according to an embodiment of the invention.

FIGS. 1C-1E illustrate several non-limiting variations of the drive unit shown and described in FIG. 1B. As shown in FIG. 1C, in some embodiments, the drive unit may further comprise one or more turbine units 93 and 94. As shown in FIG. 1D, in some embodiments, the drive unit may not or need not comprise a high-pressure compressor or combustor. As shown in FIG. 1E, in some embodiments, air may enter the fuel cell motor assembly air inlet fan 96, which may be connected to the fuel cell motor assembly external drive shaft 95, which can be used to drive one or more shafts.

Figure 2A:
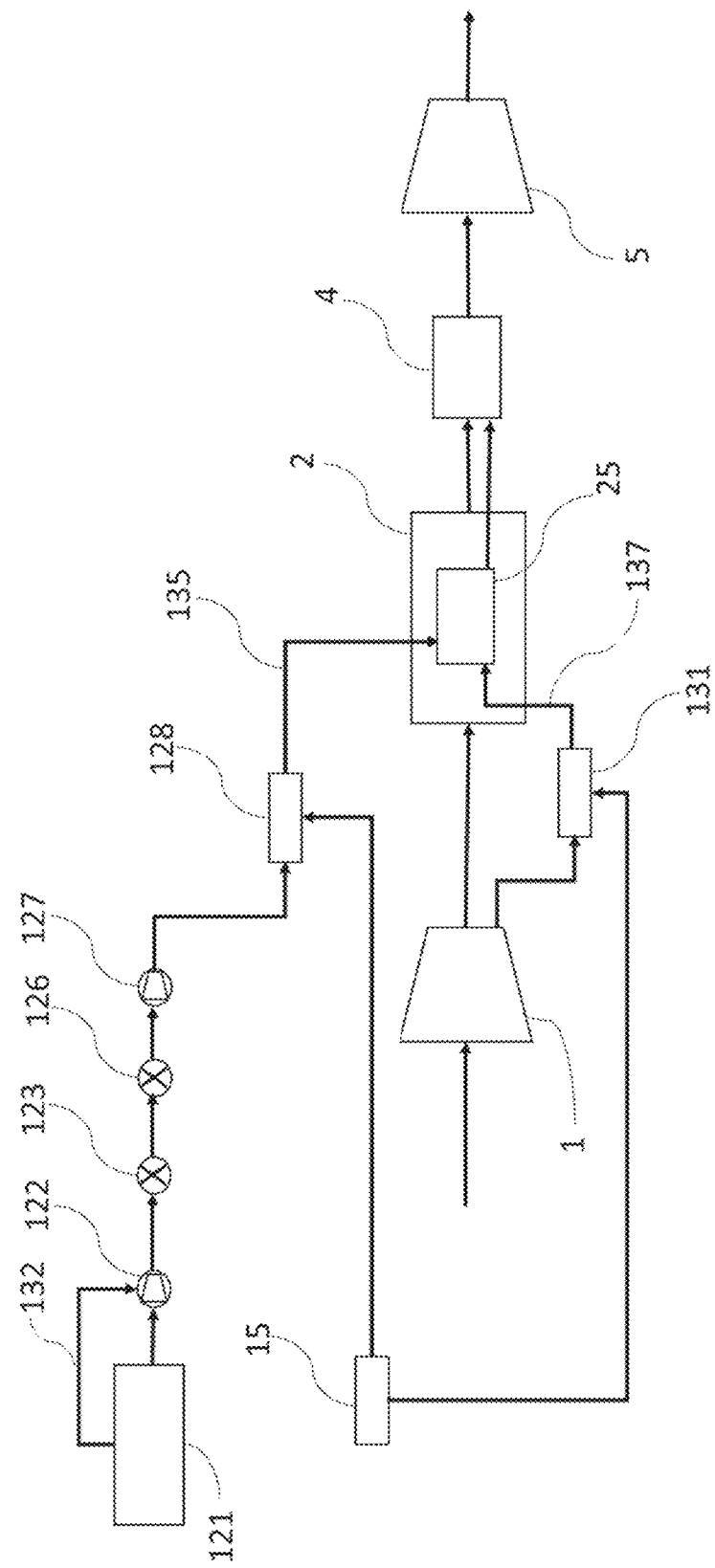
FIG. 2A schematically illustrates the fuel and airflow through the fuel cell motor assemblies according to an embodiment of the invention.
Figure 2B:
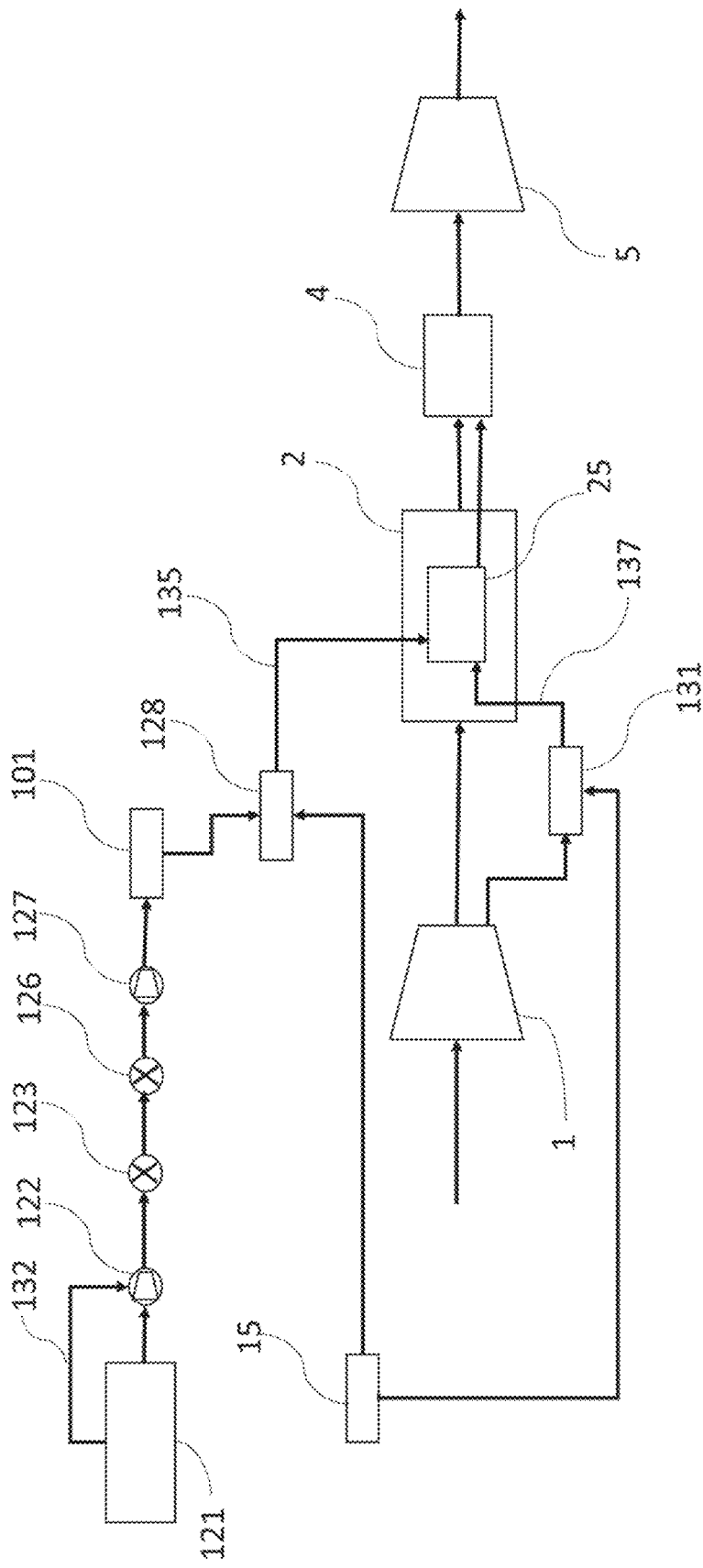
FIG. 2B schematically illustrates the fuel and airflow through the fuel cell motor assemblies with a fuel reformer according to an embodiment of the invention.
Figure 4:
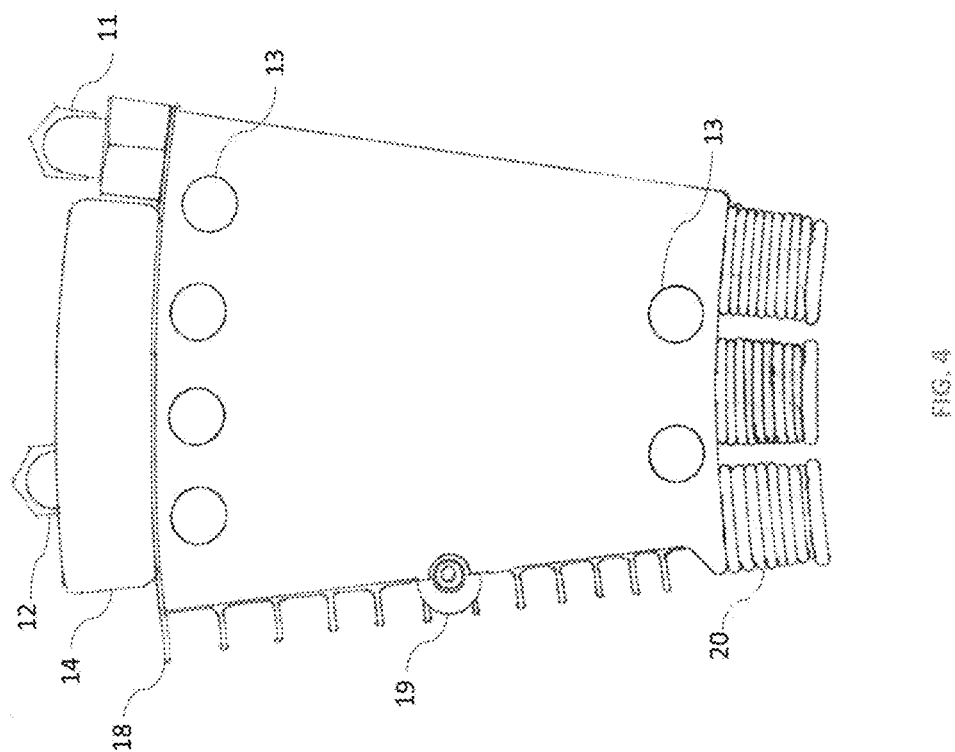
FIG. 4 schematically illustrates a rear view (aft looking forward) of an individual fuel cell motor assembly, in accordance with some embodiments.
Figure 5:
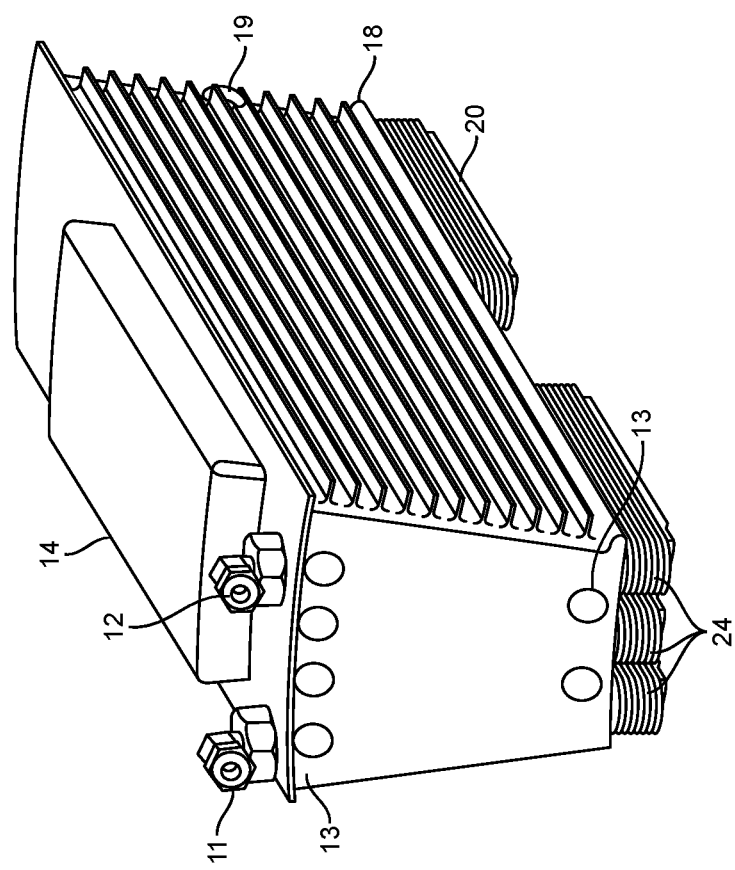
FIG. 5 schematically illustrates an isometric view showing a perspective view of the fuel cell motor assembly according to an embodiment of the invention.

Referring to FIG. 4 and FIG. 5, in some embodiments, pressure regulated airflow may be provided from the high stage Compressor 1 to one or more Fuel Cell Motor Assemblies 25 (described in greater detail below) via a Regulated Air Inlet 11. The pressure regulated airflow may be pressure regulated using a Flow and Pressure Regulator 131 as shown in FIGS. 2A-2B. Pressure regulated fuel may be provided from the Aircraft Fuel Tank 121 to the Fuel Cell Motor Assemblies 25 via the Regulated Hydrogen Inlet 12. The pressure regulated fuel may be pressure regulated using a Flow and Pressure Regulator 128 as shown in FIGS. 2A-2B. The flow and pressure regulator may be configured to regulate pressure to within a range of pressures. The range of pressures may be, for example, about 14.7 psia to about 116 psia. The range of pressures may be pre-determined. The range of pressures may be adjusted dynamically based on a performance of the drive unit.

Figure 6B:
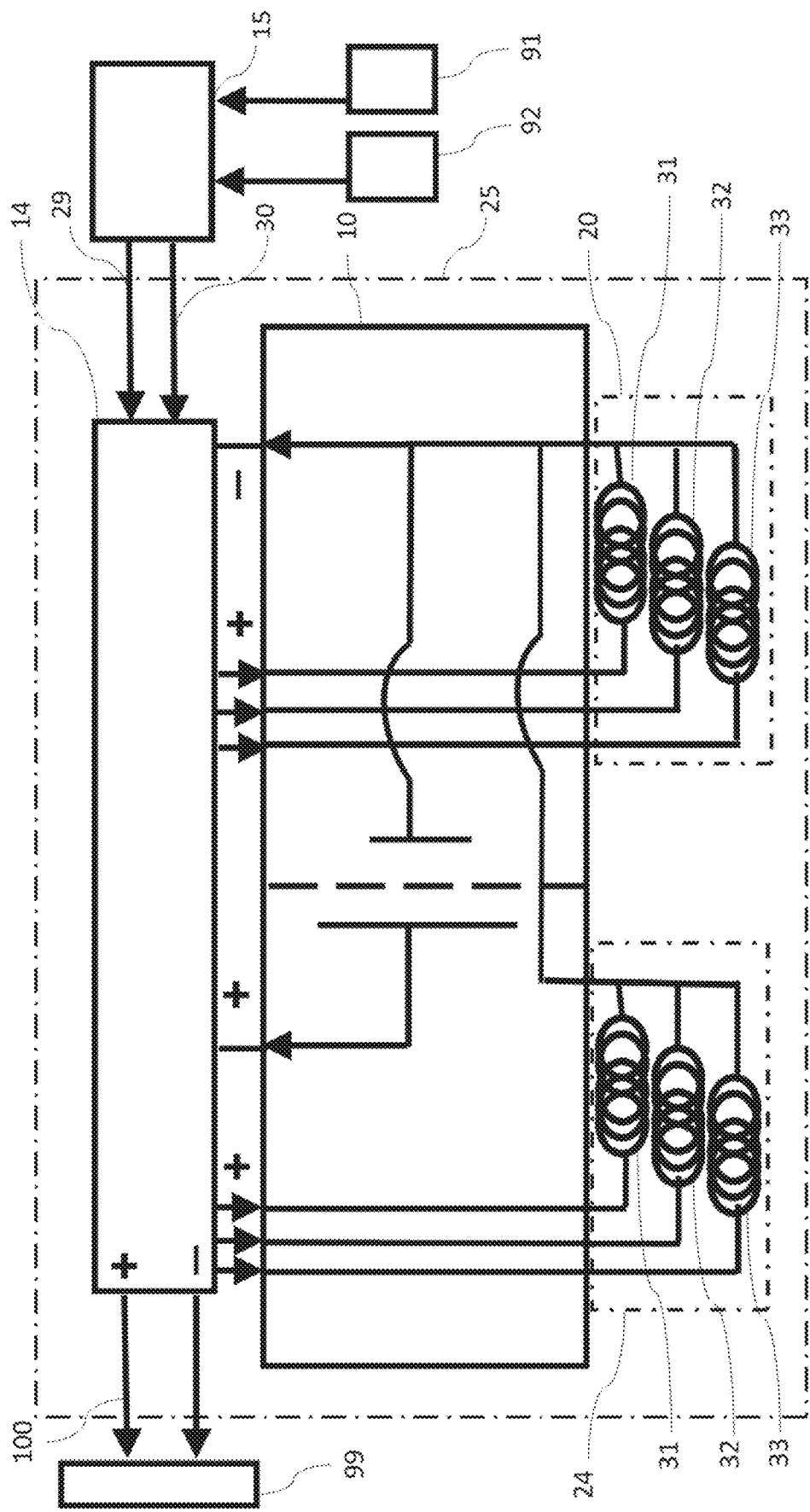
FIG. 6B is an electrical schematic showing the fuel cell motor assembly and master control unit according to an embodiment of the invention with connection to vehicle power, in accordance with some embodiments.
Figure 6C:
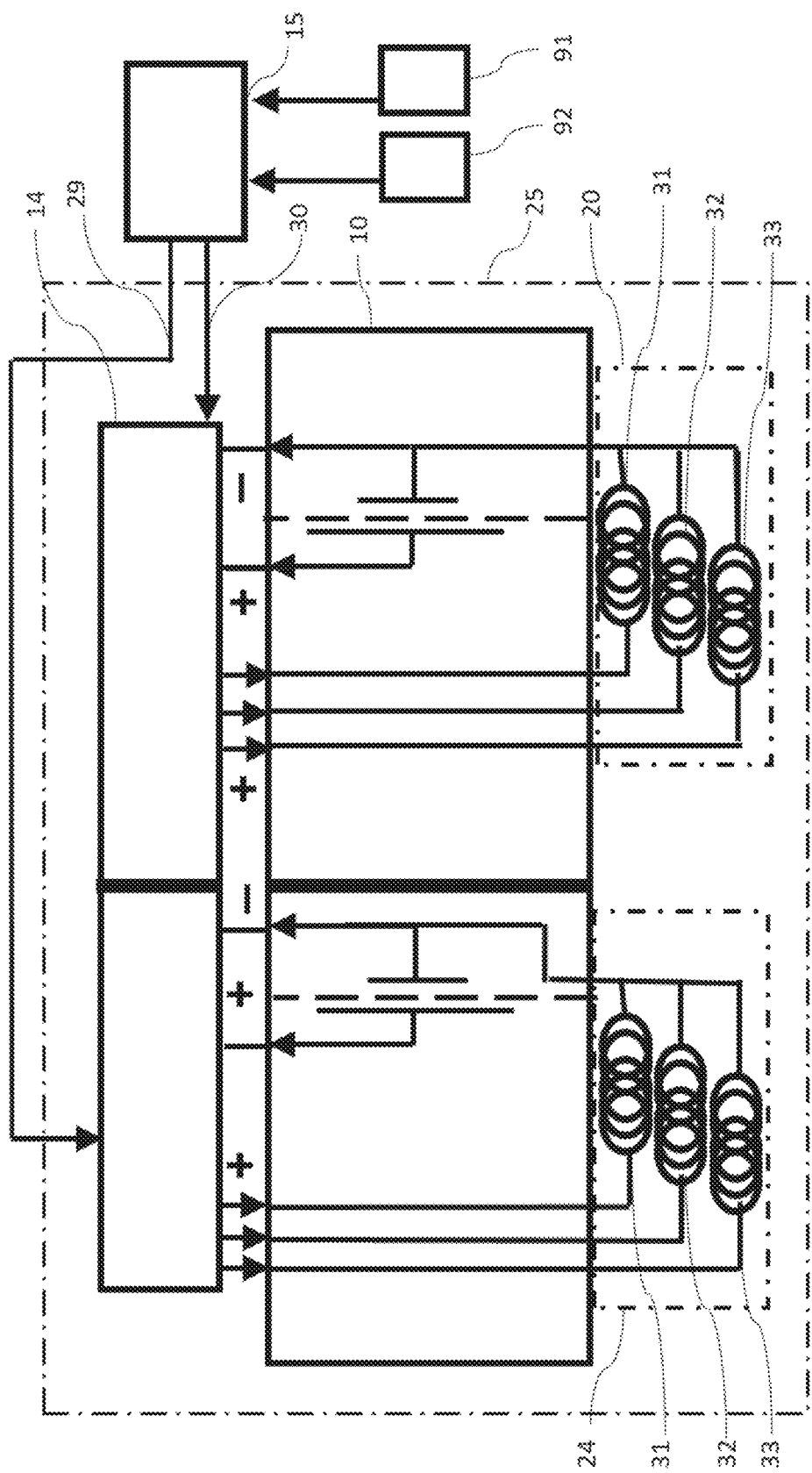
FIG. 6C is an electrical schematic showing the fuel cell motor assembly partitioned and a master control unit according to the embodiment of the invention.

In some embodiments, the regulated fuel and air supplied to one or more fuel cell motor assemblies 25 may be increased to generate more electrical power than is required for thrust generation of the power unit, in order to supply the vehicle with excess consumable electrical power. The consumable electrical power may be provided via a connection between an external power feeder 100 between the vehicle power distribution system 99, as shown in FIG. 6B, and the fuel cell motor assemblies 25.

In some cases, a stoichiometric fuel/air mixture may be provided to the combustion chamber 4 by using a fuel and air pressure regulator 7, to supply more fuel or air to the fuel cell than is needed for oxidation but that achieves a stoichiometric mixture in the combustion chamber 4. In some cases, a stoichiometric mixture within the combustion chamber 4 may be used to produce the highest efficiency for the drive unit 83, which can be obtained by providing more fuel or air to the fuel cell motor assembly 25 than is needed for oxidation but that achieves a stoichiometric mixture in the combustion chamber to at least one fuel cell motor assembly 25.

As described above, the system may comprise one or more fuel cells. The one or more fuel cells may be configured to process the hydrogen (e.g., hydrogen in a gaseous state or phase) to generate electrical energy.

In some cases, the one or more fuel cells may comprise a solid oxide fuel cell. The solid oxide fuel cell may comprise an electrochemical conversion device that produces electricity directly from oxidizing a fuel (e.g., hydrogen). The solid oxide fuel cell may comprise an electrolyte comprising a solid oxide material. Reduction of oxygen into oxygen ions may occur at the cathode. The oxygen ions may then diffuse through the solid oxide electrolyte to the anode. The oxygen ions may facilitate electrochemical oxidation of the hydrogen fuel. Such electrochemical oxidation may produce electrons, and in some instances, a water byproduct. The electrons may then flow through a circuit that is in electrical communication with the one or more electrical conductors (described in greater detail below). In some cases, the electrical current generated using the one or more fuel cells may be used to drive one or more motors. In some cases, at least a portion of the electrical energy may be diverted to one or more coils or motor windings which can turn the high pressure compressor shaft to help maintain core flow through the propulsion system.

In some embodiments, the one or more fuel cells may comprise a segmented solid oxide fuel cell. In some cases, the one or more fuel cells may be segmented to independently power different motor windings of the one or more motor windings. In some embodiments, the fuel cell motor assembly 25 may be segmented to independently power the low-pressure shaft motor winding 20 and high-pressure shaft motor winding 24.

In some cases, the fuel cell may comprise an anode which may be coupled to a fuel line, a cathode which may be coupled to an air source, and an outlet which exhausts into a combustion chamber. In some cases, the fuel cell may be directly coupled to a controller and to coils which turn the rotor assembly and shaft, thereby eliminating the need for any external power feeders.

In some cases, the one or more fuel cells may be in fluid and/or thermal communication with a stream of air that (i) cools the one or more fuel cells via convection and (ii) flows to a combustion chamber to (a) cool the combustion chamber and/or (b) facilitate combustion of the fuel in some instances. The stream of air may be received from an ambient or surrounding environment in which the propulsion system is being used. In some preferred embodiments, the system may not or need not rely on combustion for propulsion, and the combustion chamber may only be utilized to ensure that the fuel is fully combusted and turned into water vapor so that no hydrogen leaves the engine (since hydrogen is a more potent greenhouse gas than $CO_2$). In some alternative embodiments, the combustion chamber may optionally be used for additional thrust, similar to an after burner. However, for certain specific applications, such as commercial aircraft, the primary function of the combustion chamber would be for emissions mitigation as opposed to additional or supplemental thrust.

In some cases, the one or more fuel cells may be arranged in a circular configuration. In other cases, the fuel cells may be arranged in a lateral configuration (i.e., on or along a same plane). In some cases, the fuel cells may be arranged on a plurality of different planes. The fuel cells may be oriented in a same direction. Alternatively, the fuel cells may not or need not be oriented in the same direction, and may in fact be oriented in a plurality of different directions.

In some embodiments, excess air, fuel and water may exhaust from the Fuel Cell Motor Assemblies 25, shown using small arrows in FIG. 1B, using Fuel Cell Motor Assembly Exhaust Eductor 19 as shown in FIG. 4, and may flow into the Annular Combustion Chamber 4 where any excess fuel will ignite and then flow out the rear of the Annular Combustion Chamber 4, and may be exhausted out the Engine Exhaust Nozzle 5 as shown in FIG. 1. In some cases, the flow out of the rear of the Annular Combustion Chamber 4 may be used to generate rotary power (e.g., by way of the turbine units 93 and 94) and then exhausted out the engine exhaust nozzle 5. The systems and methods disclosed herein may not be limited to a two-shaft engine, and may also be implanted for 1 and 3 shafts engines, etc. In some embodiments, the Fuel Cell Motor Assembly Exhaust Eductor 19 shown in FIG. 4, may use the high stage Compressor 1 discharge airflow as the motive fluid for the eductor. As used herein, an eductor may refer to a pump that does not require any moving parts to be able to pump out a liquid or gas. The structure of the eductor may enable a transfer energy from one fluid to another via the Venturi effect and based on a difference in pressures.

As described above, in some cases, the system may further comprise a combustion chamber in fluid communication with the one or more fuel cells. The combustion chamber may be configured to combust an exhaust flow from the one or more fuel cells to (i) fully react unused hydrogen exhausted from the one or more fuel cells and (ii) provide thermal and/or mechanical power. In some cases, the exhaust flow from the fuel cells may comprise at least a portion of the fuel (e.g., unconverted hydrogen that has not been processed by the fuel cells to produce electrical energy). The combustion chamber may be used to combust any air/fuel mixture which may exhaust from the fuel cells. Such combustion may provide an additional source of energy for propelling a vehicle. Further, the combustion of the fuel cell exhaust may reduce the chance of unburned hydrogen leaving the engine, which provides an added environmental benefit since hydrogen is a potent greenhouse gas.

In some cases, the combustion chamber may further comprise an inlet for fuel/air and an outlet for discharging exhaust. The fuel may be received from the one or more fuel tanks of the propulsion system. The air may be received from an outside environment in which the propulsion system is being operated. The exhaust may vent any combustion byproducts into the outside environment.

In some cases, the combustion chamber may comprise an inner volume. The inner volume may comprise any appropriate size or shape. In some cases, the inner volume may comprise an annular shape. In other cases, the inner volume may comprise any number or combination of cross-sectional shapes and sizes. The cross-sectional shapes and sizes may be circular, oval, elliptical, or polygonal. The cross-sectional shapes may be the same shape or similar shapes. Alternatively, the cross-sectional shapes may comprise different sizes and/or different shapes.

In some embodiments, the system may further comprise one or more electrical conductors for transmitting the electrical energy generated by the one or more fuel cells to an electrical load. The electrical load may comprise, for example, the one or more motor windings of the one or more motor assemblies.

In some cases, the one or more electrical conductors may be in thermal communication with the hydrogen fuel (e.g., cryogenic hydrogen fuel) to enable a transfer of thermal energy between the one or more electrical conductors and the hydrogen fuel. The transfer of thermal energy may heat the hydrogen fuel to facilitate a transition between a first state or phase and a second state or phase. The first state or phase may correspond to a liquid state or phase. The second state or phase may correspond to a gaseous state or phase. In some embodiments, the one or more electrical conductors may be configured to heat the fuel before the fuel enters the one or more fuel cells and/or the one or more motor assemblies.

In some embodiments, the system may further comprise a transfer device that is configured to transport (i) the electrical energy generated by the one or more fuel cells and (ii) the fuel that is used to generate the electrical energy. As described elsewhere herein, the fuel may be provided to one or more fuel cells to generate the electrical energy. The transfer device may be a hydrogen and electrical power conductor transfer device.

In some cases, the transfer device may comprise the one or more electrical conductors and a pressure vessel for transporting the fuel to the motor assemblies and/or the fuel cells. The one or more electrical conductors may be routed through an interior region or inner volume of the pressure vessel.

In some cases, the transfer device may be fluidically connected to (i) a cooling shroud providing access to the one or more motoring windings and/or (ii) an interior region of the one or more motor assemblies in which the one or more magnets are positioned.

As described above, the hydrogen and electrical power conductor transfer device may facilitate hydrogen transfer and electrical power conduction in an integrated manner (i.e., coupled to each other). The heat transfer between the conductor and hydrogen may be as high as possible, the diameter of the electrical conductor may be as low as possible, and the overall efficiency may be as high as possible.

The transfer device may comprise a cylindrical pressure vessel for conveying hydrogen. The pressure vessel may comprise an inlet to allow hydrogen to fluidically enter the pressure vessel and an outlet to allow hydrogen to exit the vessel.

The transfer device may comprise a centering device located concentrically to the pressure vessel for centering the electrical conductor radially within the cylinder. The centering device may comprise a cylindrical portion concentric and immediately adjacent to the interior of the pressure vessel with one or more pairs of centering arms protruding cylindrically and radially inward from the cylindrical portion of the centering device. The centering arms may be attached to an isolator (described in greater detail below) and may be configured to impart a centering equal and opposite spring force onto the isolator. The portion of the centering arms attached to the isolator may comprise two or more partially circumferential clamps diametrically opposed from each other and in adjacent axial positions. In some cases, the centering device may comprise one or more clamps that are configured to interlock with the opposite diametrically opposite centering arm clamps when attached to the isolator. In some cases, the centering arms may be distributed or arranged axially along the cylindrical portion to sufficiently constrain an electrical conductor (described in greater detail below) to prevent excess radial movement within the pressure vessel.

In some cases, the centering device may comprise an axial retention feature for preventing axial motion of the spacer and isolator assembly. The axial retention feature may be disposed at one end of the tube, and may comprise a flared end having an outer diameter that is greater than the inner diameter of the pressure vessel. In some alternative embodiments, one or more shoulder features or other features that result in a spacer assembly having a greater diameter than the pressure vessel may be used.

In some cases, the transfer device may further comprise an isolator for electrically isolating the electrical conductor from the centering device. The isolator may comprise an axial retention provision which (i) comprises a concentrically smaller diameter near the axial center of the isolator and (ii) is retained radially by the centering arms from diametrically opposite directions and constrained axially by the centering arms engaged in the axial retention provision.

In some cases, the transfer device may comprise an electrical conductor located concentric to the isolator, for conveying electrical power. The conductor may be electrically connected to a power source, such as the one or more fuel cells disclosed herein, and an electrical load, such as motor windings of the present disclosure. In some cases, the hydrogen fuel may be in thermal communication with the electrical conductor to allow heat to transfer from the electrical conductor to the flowing hydrogen (e.g., by convection).

In some embodiments, the drive unit may use cryogenic hydrogen as fuel and route the cryogenic hydrogen fuel through one or more Hydrogen and Electrical Power Conductor Transfer Devices 105 contained in the Fuel Cell Motor Assemblies 25 as shown in FIG. 9B. The Hydrogen and Electrical Power Conductor Transfer Device 105 may comprise an Electrical Conductor 106 for transmitting rectified AC power from the Fuel Cell Stack Power Distribution Controller and Electronic Commutator 14 to the Low Pressure Shaft Motor Winding 20 and the High Pressure Shaft Motor Winding 24.

Figure 13:
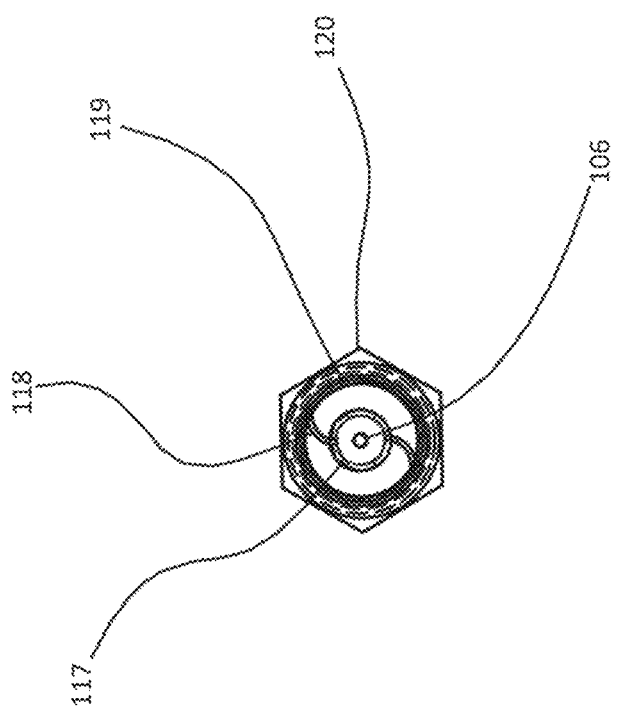
FIG. 13 shows an end view of the hydrogen and electric power conductor transfer device and centering device retention nut according to an embodiment of the invention.

The Hydrogen and Electrical Power Conductor Transfer Device 105 may further comprise a Cylindrical Pressure Vessel 108 and a Centering Device 107 located concentrically to the Cylindrical Pressure Vessel 108 for centering the Electrical Conductor 106 radially within the Cylindrical Pressure Vessel 108 as shown in FIG. 10. The Centering Device 107 may contain a Centering Device Cylindrical Wall 119 with Centering Arm 116 pairs as shown in FIG. 13 and may be attached to an Isolator 117 imparting a centering equal and opposite spring force onto the Isolator 117 as shown in FIG. 11B. The portion of the Centering Arms 116 attached to the Isolator 117 may comprise two partially Circumferential Clamps 118 which interlock with the opposite diametrically opposite Circumferential Clamps 118 when attached to the Isolator 117 as shown in FIG. 13. The Centering Arms 116 may be located in sufficient numbers axially along the cylindrical portion of the Centering Device 107 to sufficiently constrain the Electrical Conductor 106 to prevent excess radial movement within the Cylindrical Pressure Vessel 108 as shown in FIG. 11B.

Figure 14A:
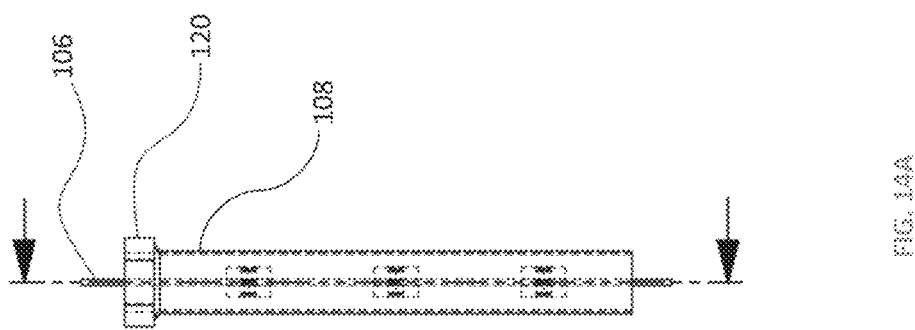
FIG. 14A shows a side view of the cylindrical pressure vessel and centering device retention nut according to an embodiment of the invention.
Figure 15:
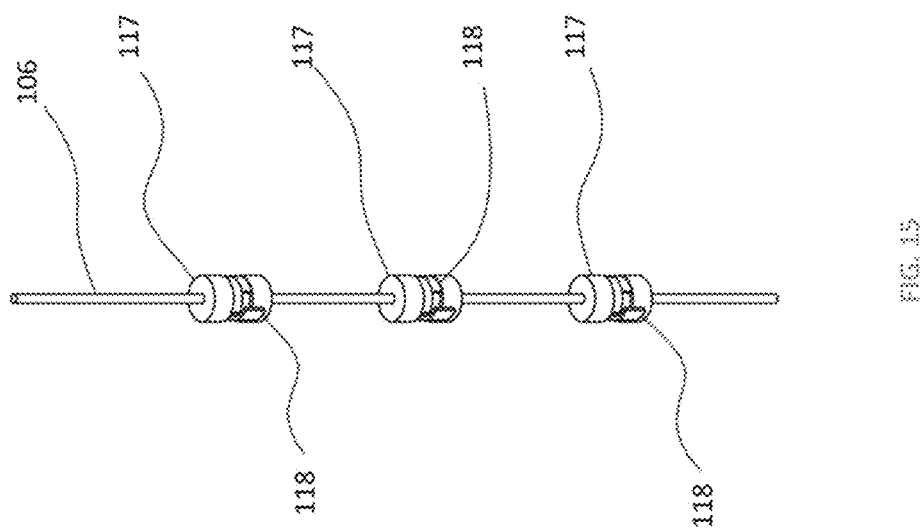
FIG. 15 shows an isometric view of the electrical conductor secured by an isolator and circumferential clamps according to an embodiment of the invention.

In some embodiments, the Centering Device 107 may comprise an axial retention feature at one end of the tube comprising a flared end such that the outer diameter of the flare in greater than the inner diameter of the Cylindrical Pressure Vessel 108, thereby preventing an axial movement of the Centering Device 107 and Isolator 117 assembly as shown in FIG. 14B. In some cases, a Centering Device Retention Nut 120 may be screwed onto external threads on the Cylindrical Pressure Vessel 108, preventing axial motion of the Centering Device 107, as shown in FIG. 14A. Other embodiments may implement shoulder features or other physical features that result in the end of the Centering Device 107 assembly having a greater diameter than the pressure vessel. The Hydrogen and Electrical Power Conductor Transfer Device 105 may also comprise an Isolator 117 for electrically isolating the Electrical Conductor 106 from the Centering Device 107, and may comprise an axial retention provision having a concentrically smaller diameter near the axial center of the isolator as shown in FIG. 15. The Isolator 117 may be retained radially by the Centering Arms 116 and constrained axially by the Centering Arms 116 engaged in the axial retention provision.

The Hydrogen and Electrical Power Conductor Transfer Device 105 may also comprise an Electrical Conductor 106 located concentric to the Isolator 117 as shown in FIG. 15. The hydrogen flowing through the Hydrogen and Electrical Power Conductor Transfer Device 105 may be heated by and/or cool the Electrical Conductor 106. This co-axial configuration and the use of hydrogen as a cooling median may enhance heat transfer between the Electrical Conductor 106 and the hydrogen and may increase the maximum allowable voltage in the Electrical Conductor 106 due the heat capacity of the hydrogen fuel and the greater electrical potential gradient before arcing when compared to air.

Figure 16:
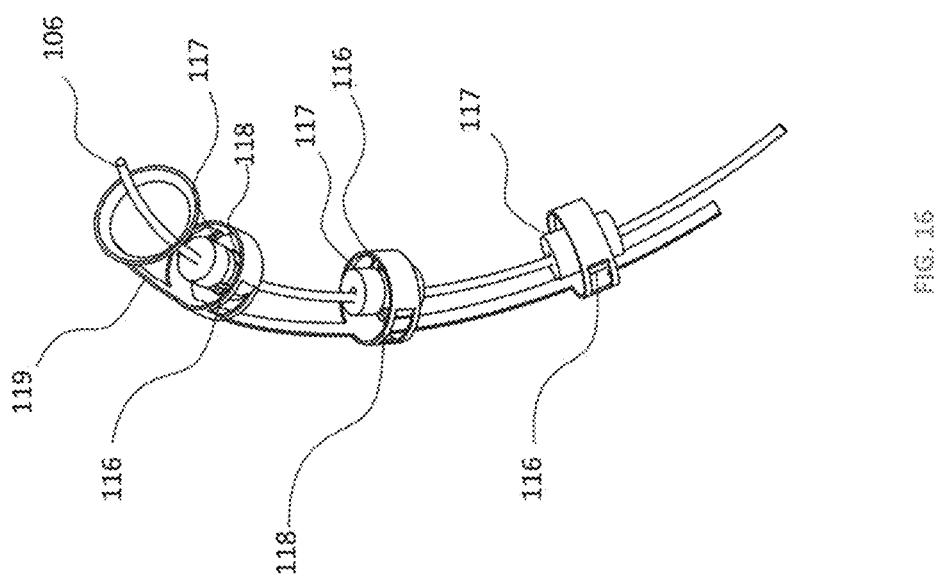
FIG. 16 schematically illustrates an isometric view of a curved electrical conductor secured by an isolator and circumferential clamps according to an embodiment of the invention.

In some embodiments, the Hydrogen and Electrical Power Conductor Transfer Device 105 may be used where bends are required by modifying the Centering Device Cylindrical Wall 119 to allow the Centering Device 107 to follow the bend of the Cylindrical Pressure Vessel 108, as shown in FIG. 16.

In another embodiment, the Hydrogen and Electrical Power Conductor Transfer Device 105 can be connected in a serial manner with other Hydrogen and Electrical Power Conductor Transfer Devices 105 by incorporating traditional flared or flare-less to end connections. In some cases, such flared/flare-less to end connections may be used to restrain the flared portion of the Centering Device 107.

Referring to FIG. 9B and FIG. 11A, in some embodiments, the hydrogen fuel may be transferred from the Regulated Hydrogen Inlet 12, through one or more Hydrogen and Electrical Power Conductor Transfer Devices 105, into Inlet Manifold 109 at Hydrogen Inlet Location to Inlet Manifold 113, through one or more Axial Transfer Sections 112, which may comprise one or more passages that force interspatial flow between the wires contained in Low Pressure Shaft Motor Winding 20 and the High Pressure Shaft Motor Winding 24 (see FIG. 12A), into the Outlet Manifold 110. As shown in FIG. 10 and FIG. 12B, the hydrogen fuel may then be directed to the Fuel Cell Motor Assemblies 25 via a Hydrogen Outlet Location to Fuel Cell Motor Assembly 114.

The hydrogen flowing through the Hydrogen and Electrical Power Conductor Transfer Device 105 may be heated by and may cool the Electrical Conductor 106. The hydrogen flowing through the Motor Winding Cooling Shroud 105, which may comprise the Inlet Manifold 109, Axial Transfer Section 112 and Outlet Manifold 110, may be heated by and may cool the Low Pressure Shaft Motor Winding 20 and the high Pressure Shaft Motor Winding 24. In some embodiments, the heated hydrogen may then enter the Fuel Cell Assembly 25 to allow production of electrical power for thrust or propulsion.

As described elsewhere herein, in some cases, cryogenic hydrogen may be used as the fuel. The cryogenic hydrogen fuel may be routed through the Hydrogen and Electrical Power Conductor Transfer Devices 105 contained in the Fuel Cell Motor Assemblies 25. In some cases, the Hydrogen and Electrical Power Conductor Transfer Device 105 may also transfer hydrogen from the Regulated Hydrogen Inlet 12 to the motor windings and shaft permanent magnet cooling system, as shown in FIG. 9B.

In some cases, Hydrogen may exit the Hydrogen and Electrical Power Conductor Transfer Device 105 radially, flow axially across the Permanent Magnets 16 and over and through the Low Pressure Shaft Motor Winding 20 and the High Pressure Shaft Motor Winding 24. The heated hydrogen may then exit the annular volume into the Fuel Cell Motor Assemblies 25 to allow production of electrical power for thrust from the drive unit 83. The hydrogen may be heated by and may cool the Permanent Magnets 16 and the Low Pressure Shaft Motor Winding 20 and the High Pressure Shaft Motor Winding 24.

In some embodiments, the transfer device may be connected in an integrated manner to a motor winding cooling shroud, which may be coupled to the fuel cell inlet to minimize the volume of hydrogen within the drive unit and maximize heat transfer between the hydrogen and the motor windings. The motor winding cooling shroud may comprise an inlet manifold, one or more axial transfer sections, and an exhaust manifold. In some cases, the motor winding cooling shroud may comprise three or more axial transfer sections.

A transfer tube outlet (through which hydrogen is flowing) may be fluidically connected to an inlet manifold of the motor winding cooling shroud. The inlet manifold may be fluidically connected to the three axial transfer sections to allow the flow of hydrogen to enter into each of the three transfer sections and flow axially along the motor windings to allow heat to be convectively transferred between the windings and the hydrogen while keeping the windings below their critical operating temperature.

In some cases, the transfer sections may form an elongated toroid which surround, but do not contain, the stator arms. The flow of hydrogen may be directed into the inter-spatial areas between the wires within the windings. In some cases, the three transfer sections may be fluidically connected to the outlet manifold combining the outlet flow from the three transfer sections. The outlet manifold may be fluidically connected to the fuel cell inlet allowing heated hydrogen to be supplied to the fuel cell.

In some embodiments, the Hydrogen and Electrical Power Conductor Transfer Device can be used where bends are required by modifying the Centering Device Cylindrical Wall to allow the Centering Device to follow the bend of the Cylindrical Pressure Vessel. The bend may have an angle that ranges from at least about 1 degree to about 179 degrees.

In some embodiments, the Hydrogen and Electrical Power Conductor Transfer Device can be connected in a serial manner with other Hydrogen and Electrical Power Conductor Transfer Devices by incorporating traditional flared or flare-less to end connections. Such flared/flare-less to end connections may be used to restrain the flared portion of the Centering Device.

In some embodiments, the system may further comprise a controller (also referred to herein as a processor, a processing unit, or a logic circuit). The controller may be configured to control a distribution of power between a first motor winding and a second motor winding of the one or more motor windings. Such control of the distribution of power may be implemented based at least in part on one or more timing signals.

In some cases, a Fuel Cell Stack Power Distribution Controller and Electronic Commutator 14 may be used to distribute power between the Low Pressure Shaft Motor Winding 20 and the High Pressure Shaft Motor Winding 24 based on one or more signals from the Controller 15, as shown in FIGS. 6A-6C and FIGS. 7A-7B. The Fuel Cell Stack Power Distribution Controller and Electronic Commutator 14 may be implemented to optimize the individual shaft speeds based on flight profile such as take-off, climb, cruise, hold, and descent.

In some embodiments, the system may further comprise a timing controller. The timing controller may be configured to generate the one or more timing signals. The one or more timing signals may convey information on a position and speed of the at least one shaft or rotor.

In some cases, a Low-Pressure Shaft Timing Signal 29 and High-Pressure Shaft Timing Signal 30 may be sent to each Fuel Cell Stack Power Distribution Controller and Electronic Commutator 14 from a single Controller 15.

Although each of the individual fuel cell motor assemblies 25 may behave as a single pole 3 phase motor, the aforementioned timing signals may convey information on shaft position and speed to allow the individual Fuel Cell Motor Assemblies 25 to monitor and precisely control the alternating current timing to each coil, thereby allowing the circumferential ring to operate as a multi-pole (e.g., 16 pole), 3 phase brushless direct current electric motor (items 34 through 81) capable of distributing power between the Low Pressure Shaft 8 and High Pressure Shaft 9. Although 16 fuel cell motor assemblies 25 with 3 Low Pressure Shaft Motor Winding 20, and High Pressure Shaft Motor Winding 24 and with 3 phases are shown, any number of fuel cell motor assemblies 25, Low Pressure Shaft Motor Winding 20, High Pressure Shaft Motor Windings 24, or phases may be used to meet the power needs of the drive unit. In some cases, no shaft motive electrical power may be shared between the individual Fuel Cell Motor Assemblies 25. In some cases, the Fuel Cell Motor Assemblies 25 may be arranged circumferentially as shown in FIG. 3 and may be individually removed for ease of maintenance. In another embodiment, the Fuel Cell Motor Assembly 25 may comprise a continuous ring of fuel cell motor assemblies.

In some embodiments, the controller may be configured to monitor and control one or more parameters of a current provided to the one or more motor windings. The one or more parameters may comprise, for example, an alternating current timing or an amount of current.

In some embodiments, the controller may be configured to adjust a current provided to the one or more motor windings to modify or optimize a rotational speed of the at least one shaft or rotor based on a flight profile of the vehicle. The flight profile may correspond to take-off, climb, cruise, descent, and/or landing.

In some preferred embodiments, a closed loop control may be implemented to control shaft speed using fuel flow and accompanying regulated airflow as controlled by the controller. In some cases, if the shaft speed is below target speed (e.g., as detected using one or more sensors), fuel flow may be increased until the target speed is reached. In some cases, if the shaft speed is below target speed (e.g., as detected using one or more sensors), fuel flow may be reduced until target speed is reached. The one or more sensors may comprise, in some instances, a shaft speed sensor. The thrust of the engine may be controlled based at least in part on one or more measurements obtained using one or more shaft speed sensors for input (e.g., the low pressure shaft speed and position sensor 91 and/or the high pressure shaft speed and position sensor 92 illustrated in FIG. 1A). In such cases, current measuring devices may not or need not be used in order to monitor and control engine thrust. instead of also current measuring devices. In any of the embodiments described herein, a closed loop speed control mechanism or configuration may be implemented by monitoring, regulating, and/or controlling fuel flow and air flow.

In some cases, the system may comprise a fuel reformer. The fuel reformed may be configured to convert the fuel from a liquid phase to a gas phase. In some cases, the fuel reformer may be located upstream of the one or more fuel cells.

As shown in FIG. 2B, in some embodiments, the drive unit may further comprise at least one fuel reformer 101 that is upstream of the fuel cell motor assemblies 25. The fuel reformer 101 may be configured to convert a fuel that is liquid at normal operating atmospheric pressures and temperatures to gaseous hydrogen that is used by the fuel cell motor assemblies 25.

In some cases, the system may further comprise one or more direct current to alternating current inverters and electronic commutators. The direct current to alternating current inverters and electronic commutators may be in electrical communication with the one or more motor assemblies. The direct current to alternating current inverters and electronic commutators may be configured to convert the direct current electrical energy generated by the one or more fuel cells into alternating current electrical energy to (i) power the one or more motor windings and (ii) produce electrical torque for driving the at least one shaft or rotor. The rotation of the at least one shaft or rotor may be used to provide mechanical power (e.g., for driving one or more fans, compressors, turbines, etc.). In some cases, the one or more direct current to alternating current inverters and electronic commutators may be physically integrated into the motor assemblies (or physically integrated with a structural component of the motor assemblies) to reduce the distance across which power is transmitted between the fuel cells and the motor windings.

In some cases, the system may further comprise one or more cooling fins in thermal communication with the one or more motor assemblies and exhaust air to allow a transfer of thermal energy produced by the one or more fuel cells within the one or more motor assemblies to the exhaust air to provide thermal power and to accelerate the exhaust air. In some embodiments, the cooling fins may be disposed on a body or an outer surface of the one or more motor assemblies. In other embodiments, the cooling fins may be disposed on a portion of the one or more fuel cells.

The restrictions associated with high electrical power transmission can be overcome by integrating (i) the device that converts the chemical energy into electrical energy (e.g., the one or more fuels cells) together with (ii) the device that converts the electrical energy into mechanical energy (i.e., the one or more motor windings), and (iii) the controller, which directly drives shafts of a power unit, such as a turbofan engine. Such integration can provide an integrated fuel cell motor assembly device that, when supplied with fuel, produces a torque that can be applied to a shaft without the need for external high-power electrical transmission conductors.

By removing the restrictions associated with the use of high-power electrical transmission conductors, such a highly integrated approach can allow for very large drive units necessary for high power density applications such as large transport aircraft. By embedding this device directly into a power unit such as a turbofan engine and eliminating the turbines, thermal energy can be harnessed to directly provide thrust for the vehicle or, when used with turbines, can provide assistance torque to turn the shafts of the turbines.

In some embodiments, the restrictions associated with high electrical power transmission can be overcome by integrating the transmission of both the hydrogen and the electrical power conductor into a single component (e.g., a cylindrical pressure vessel with the conductor centered within and electrically isolated from the pressure vessel in a co-axial manner). Such a configuration may allow heat to be transferred from the conductor to the flowing hydrogen, which keeps the conductor below its maximum critical operating temperature and enables higher voltages and currents to be used for smaller diameter electrical conductors compared to traditional installations, which typically rely on air as a cooling and insulation medium. The use of co-axial transfer devices, along with winding cooling shrouds and a cooling system for the motor windings and permanent magnets, can provide an attractive solution to enable carbon free, environmentally friendly, efficient power delivery method for volume and weight limited vehicles such as large transport aircraft.

Figure 8:
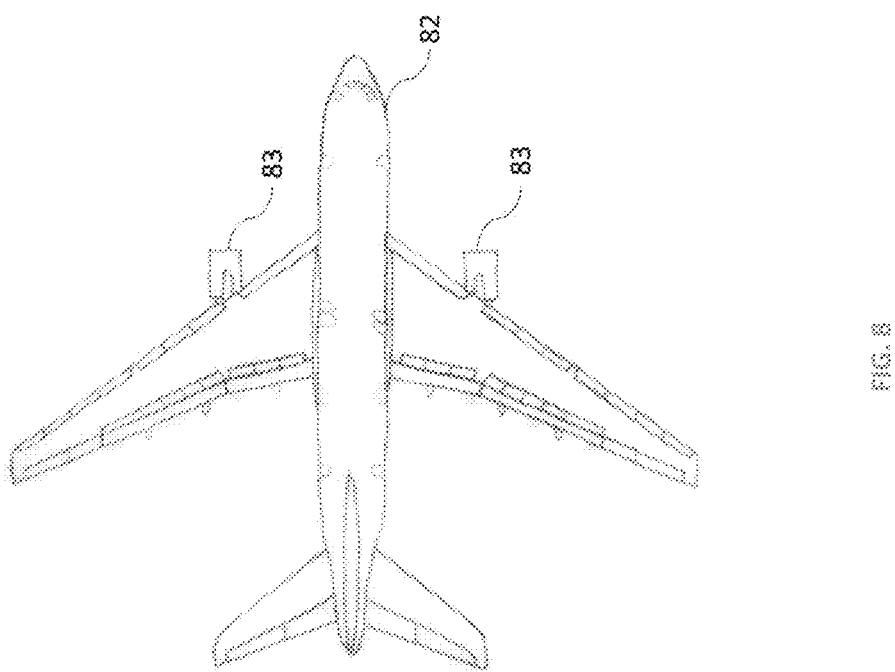
FIG. 8 schematically illustrates an aircraft comprising a plurality of drive units, in accordance with some embodiments.

FIG. 8 shows an example of a vehicle that may be operated or propelled using the systems of the present disclosure. In some embodiments, the vehicle may comprise an aircraft 82 that comprises two drive units 83 that can provide thrust for the aircraft 82. The drive units 32 disclosed herein may use hydrogen directly as the fuel to provide a means for large transport aircraft to operate efficiently with carbon free emissions.

The systems disclosed herein may be applied to any suitable terrestrial vehicle. A terrestrial vehicle may be a motor vehicle or any other vehicle that uses a source of energy, renewable or nonrenewable, (solar, thermal, electrical, wind, petroleum, etc.) to move across or in close proximity to the ground (within 1 meter, 2 meter, 3 meter, etc.). The terrestrial vehicle may be a self-driving vehicle or may be operated by a living subject, such as a human or animal. The terrestrial vehicle may be stationary, moving, or capable of movement.

The systems disclosed herein may be applied to any suitable aerial vehicle. An aerial vehicle may be a motor vehicle or any other vehicle that uses a source of energy, renewable or nonrenewable, (solar, thermal, electrical, wind, petroleum, etc.) to move through the air or through space. The aerial vehicle may be a self-driving vehicle or may be operated by a living subject, such as a human or animal. The aerial vehicle may be stationary, moving, or capable of movement.

The systems disclosed herein may be applied to any suitable aquatic vehicle. An aquatic vehicle may be a motor vehicle or any other vehicle that uses a source of energy, renewable or nonrenewable, (solar, thermal, electrical, wind, petroleum, etc.) to move across or through water. The aquatic vehicle may be a self-driving vehicle or may be operated by a living subject, such as a human or animal. The aquatic vehicle may be stationary, moving, or capable of movement.

In some cases, the vehicle may be a land-bound vehicle. The vehicle may travel over land. Alternatively or in addition, the vehicle may be capable of traveling on or in water, underground, in the air, and/or in space. The vehicle may be an automobile. The vehicle may be a land-bound vehicle, watercraft, aircraft, and/or spacecraft. The vehicle may travel freely over a surface. The vehicle may travel freely within two or more dimensions. The vehicle may primarily drive on one or more roads.

Optionally, the vehicle may be an unmanned vehicle. The vehicle may not have a passenger or operator on-board the vehicle. The vehicle may or may not have a space within which a passenger could ride. The vehicle may or may not have space for cargo or objects to be carried by the vehicle. The vehicle may or may not have tools that may permit the vehicle to interact with the environment (e.g., collect samples, move objects). The vehicle may or may not have objects that may be emitted to be dispersed to the environment (e.g., light, sound, liquids, pesticides). The vehicle may operate without requiring a human operator.

In some embodiments, the vehicle may permit one or more passengers to ride on-board the vehicle. The vehicle may comprise a space for one or more passengers to ride the vehicle. The vehicle may have an interior cabin with space for one or more passengers. The vehicle may or may not have an operator. For example, a vehicle may have a space for an operator of the vehicle. In some embodiments, the vehicle may be capable of being controlled by a human operator. Alternatively or in addition, the vehicle may be operated using an autonomous driving system.

In another aspect, the present disclosure provides a method for propulsion. The method may comprise providing a fuel to a system. The system may comprise one or more motor assemblies for driving at least one shaft or rotor of a vehicle, which one or more motor assemblies may comprise one or more motor windings and one or more magnets.

In some cases, the method may comprise using the fuel to cool to the one or more motor windings and one or more magnets (e.g., via convection), before directing the fuel to one or more fuel cells in fluid communication with the one or more motor assemblies. The one or more fuel cells may be configured to generate direct current electrical energy from the fuel that is directed through a portion of the one or more motor assemblies. The flow of fuel through the motor assemblies may help to (i) cool the one or more motor windings and the one or more magnets and (ii) and heat the fuel before the fuel enters the one or more fuel cells.

In some cases, the method may comprise using the electrical energy generated by the one or more fuel cells to drive the at least one shaft or rotor of the vehicle. In some cases, the method may comprise directing the electrical energy to one or more motor windings of the motor assemblies to generate the torque required to drive the at least one shaft or rotor.

In some embodiments, the method may comprise directing at least a portion of the fuel (e.g., unconverted hydrogen from the one or more fuel cells) to a combustion chamber in fluid communication with the one or more fuel cells. In some embodiments, the combustion chamber may be configured to combust an exhaust flow from the one or more fuel cells to (i) react unused hydrogen exhausted from the one or more fuel cells and (ii) provide thermal and/or mechanical power usable for propulsion.

Computer Systems

Figure 17:
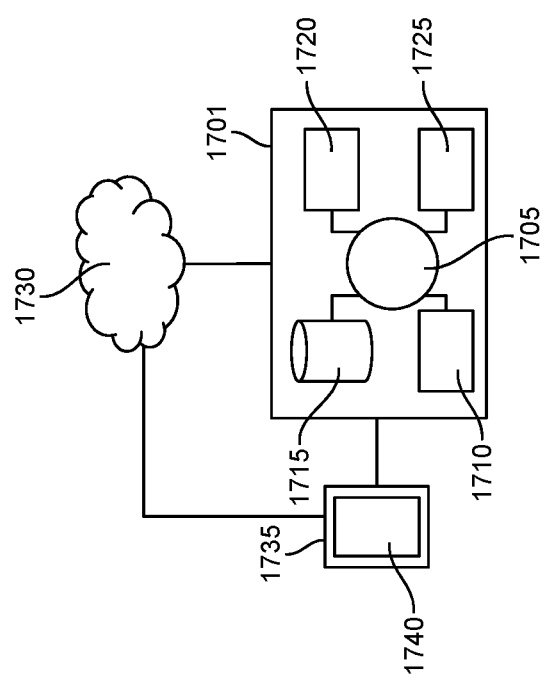
FIG. 17 schematically illustrates a computer system that is programmed or otherwise configured to implement methods provided herein.

In an aspect, the present disclosure provides computer systems that are programmed or otherwise configured to implement methods of the disclosure, e.g., any of the subject methods for propulsion. FIG. 17 shows a computer system 1701 that is programmed or otherwise configured to implement a method for propulsion. The computer system 1701 may be configured to, for example, (i) control a flow of hydrogen between two or more components or subsystems of the propulsion systems described herein, or (ii) control a distribution of electrical energy produced using one or more of the presently disclosed fuel cells to one or more motor windings of the motor assemblies described herein. The computer system 1701 can be an electronic device of a user or a computer system that is remotely located with respect to the electronic device. The electronic device can be a mobile electronic device.

The computer system 1701 may include a central processing unit (CPU, also "processor" and "computer processor" herein) 1705, which can be a single core or multi core processor, or a plurality of processors for parallel processing. The computer system 1701 also includes memory or memory location 1710 (e.g., random-access memory, read-only memory, flash memory), electronic storage unit 1715 (e.g., hard disk), communication interface 1720 (e.g., network adapter) for communicating with one or more other systems, and peripheral devices 1725, such as cache, other memory, data storage and/or electronic display adapters. The memory 1710, storage unit 1715, interface 1720 and peripheral devices 1725 are in communication with the CPU 1705 through a communication bus (solid lines), such as a motherboard. The storage unit 1715 can be a data storage unit (or data repository) for storing data. The computer system 1701 can be operatively coupled to a computer network ("network") 1730 with the aid of the communication interface 1720. The network 1730 can be the Internet, an internet and/or extranet, or an intranet and/or extranet that is in communication with the Internet. The network 1730 in some cases is a telecommunication and/or data network. The network 1730 can include one or more computer servers, which can enable distributed computing, such as cloud computing. The network 1730, in some cases with the aid of the computer system 1701, can implement a peer-to-peer network, which may enable devices coupled to the computer system 1701 to behave as a client or a server.

The CPU 1705 can execute a sequence of machine-readable instructions, which can be embodied in a program or software. The instructions may be stored in a memory location, such as the memory 1710. The instructions can be directed to the CPU 1705, which can subsequently program or otherwise configure the CPU 1705 to implement methods of the present disclosure. Examples of operations performed by the CPU 1705 can include fetch, decode, execute, and writeback.

The CPU 1705 can be part of a circuit, such as an integrated circuit. One or more other components of the system 1701 can be included in the circuit. In some cases, the circuit is an application specific integrated circuit (ASIC).

The storage unit 1715 can store files, such as drivers, libraries and saved programs. The storage unit 1715 can store user data, e.g., user preferences and user programs. The computer system 1701 in some cases can include one or more additional data storage units that are located external to the computer system 1701 (e.g., on a remote server that is in communication with the computer system 1701 through an intranet or the Internet).

The computer system 1701 can communicate with one or more remote computer systems through the network 1730. For instance, the computer system 1701 can communicate with a remote computer system of a user (e.g., an operator of a vehicle that is configured to generate propulsion or thrust using the presently disclosed systems and methods). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1701 via the network 1730.

Methods as described herein can be implemented by way of machine (e.g., computer processor) executable code stored on an electronic storage location of the computer system 1701, such as, for example, on the memory 1710 or electronic storage unit 1715. The machine executable or machine readable code can be provided in the form of software. During use, the code can be executed by the processor 1705. In some cases, the code can be retrieved from the storage unit 1715 and stored on the memory 1710 for ready access by the processor 1705. In some situations, the electronic storage unit 1715 can be precluded, and machine-executable instructions are stored on memory 1710.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1701, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1701 can include or be in communication with an electronic display 1735 that comprises a user interface (UI) 1740 for providing, for example, a portal for a user to (i) monitor and/or control an amount of electrical energy generated by the one or more fuel cells, or (ii) monitor and/or control an amount of fuel provided to one or more components of the propulsion systems described above. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1705. For example, the algorithm may be configured to (i) control a flow of hydrogen fuel between two or more components or subsystems of the propulsion systems based on a performance of the system (or any components thereof), or (ii) control a distribution of electrical energy produced using the one or more fuel cells to the one or more motor windings of the motor assemblies based on an amount of power needed to execute a desired flight maneuver.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A system, comprising:
    one or more motor assemblies for driving at least one shaft or rotor of a vehicle, wherein the one or more motor assemblies comprise one or more motor windings and one or more magnets;
    one or more fuel cells in fluid communication with the one or more motor assemblies, wherein the one or more fuel cells are segmented to independently power different motor windings of the one or more motor windings, and wherein the one or more fuel cells are further configured to generate direct current electrical energy from a fuel that is directed through a portion of the one or more motor assemblies to (i) cool the one or more motor windings and the one or more magnets and (ii) and heat the fuel before the fuel enters the one or more fuel cells; and
    a combustion chamber in fluid communication with the one or more fuel cells, wherein the combustion chamber is configured to combust an exhaust flow from the one or more fuel cells to react unused hydrogen exhausted from the one or more fuel cells.

2. The system of claim 1, wherein the exhaust flow from the one or more fuel cells comprises at least a portion of the fuel.

3. The system of claim 1, further comprising one or more electrical conductors for transmitting the electrical energy generated by the one or more fuel cells to an electrical load, wherein the electrical load comprises the motor windings.

4. The system of claim 3, wherein the one or more electrical conductors are in thermal communication with the fuel to enable a transfer of thermal energy between the one or more electrical conductors and the fuel, and wherein the one or more electrical conductors are configured to heat the fuel before the fuel enters the one or more fuel cells or the one or more motor assemblies.

5. The system of claim 3, further comprising a transfer device for transporting the electrical energy and the fuel, wherein the transfer device comprises the one or more electrical conductors and a pressure vessel for transporting the fuel to one or both of the one or more motor assemblies or the one or more fuel cells.

6. The system of claim 5, wherein the electrical conductors are routed through an interior region or inner volume of the pressure vessel.

7. The system of claim 5, wherein the transfer device is fluidically connected to one or both of: (i) a cooling shroud providing access to the one or more motoring windings or (ii) an interior region of the one or more motor assemblies in which the one or more magnets are positioned.

8. The system of claim 1, wherein the one or more motor windings and the one or more magnets are in thermal communication with the fuel to enable a transfer of thermal energy between (i) the one or more motor windings and the one or more magnets and (ii) the fuel, wherein the one or more motor windings and the one or more magnets are configured to heat the fuel before the fuel enters the one or more fuel cells.

9. The system of claim 1, wherein the one or more fuel cells are in one or both of fluid or thermal communication with a stream of air that:
    (i) cools the one or more fuel cells via convection; and
    (ii) flows to the combustion chamber to one or both of (a) cool the combustion chamber or (b) facilitate combustion of the fuel.

10. The system of claim 1, further comprising a controller configured to control a distribution of power between a first motor winding and a second motor winding of the one or more motor windings, based at least in part on one or more timing signals.

11. The system of claim 10, further comprising a timing controller configured to generate the one or more timing signals, wherein the one or more timing signals convey information on a position and speed of the at least one shaft or rotor, wherein the controller is configured to monitor and control one or more parameters of a current provided to the one or more motor windings, wherein the one or more parameters comprise an alternating current timing or an amount of current.

12. The system of claim 10, wherein the controller is configured to adjust a current provided to the one or more motor windings to adjust or optimize a rotational speed of the at least one shaft or rotor based on a flight profile of the vehicle.

13. The system of claim 1, wherein the one or more fuel cells comprise a solid oxide fuel cell or a segmented solid oxide fuel cell.

14. The system of claim 1, further comprising one or more direct current to alternating current inverters and electronic commutators in electrical communication with the one or more motor assemblies, wherein the one or more direct current to alternating current inverters and electronic commutators are configured to convert the direct current electrical energy generated by the one or more fuel cells into alternating current electrical energy to power the one or more motor windings to produce electrical torque for driving the at least one shaft or rotor to produce mechanical power.

15. The system of claim 1, further comprising one or more cooling fins in thermal communication with the one or more motor assemblies and exhaust air to allow a transfer of thermal energy produced by the one or more fuel cells or the one or more motor assemblies to the exhaust air to provide thermal energy and to accelerate the exhaust air.

16. A system, comprising:
one or more motor assemblies for driving at least one shaft or rotor of a vehicle, wherein the one or more motor assemblies comprise one or more motor windings and one or more magnets;
one or more fuel cells in fluid communication with the one or more motor assemblies, wherein the one or more fuel cells are configured to generate direct current electrical energy from a fuel that is directed through a portion of the one or more motor assemblies to (i) cool the one or more motor windings and the one or more magnets and (ii) and heat the fuel before the fuel enters the one or more fuel cells;
a combustion chamber in fluid communication with the one or more fuel cells, wherein the combustion chamber is configured to combust an exhaust flow from the one or more fuel cells to react unused hydrogen exhausted from the one or more fuel cells; and
one or more cooling fins in thermal communication with the one or more motor assemblies and exhaust air to allow a transfer of thermal energy produced by the one or more fuel cells or the one or more motor assemblies to the exhaust air to provide thermal energy and to accelerate the exhaust air.

17. The system of claim 16, wherein the exhaust flow from the one or more fuel cells comprises at least a portion of the fuel.

18. The system of claim 16, further comprising one or more electrical conductors for transmitting the electrical energy generated by the one or more fuel cells to an electrical load, wherein the electrical load comprises the motor windings.

19. The system of claim 18, wherein the one or more electrical conductors are in thermal communication with the fuel to enable a transfer of thermal energy between the one or more electrical conductors and the fuel, and wherein the one or more electrical conductors are configured to heat the fuel before the fuel enters the one or more fuel cells or the one or more motor assemblies.

20. The system of claim 18, further comprising a transfer device for transporting the electrical energy and the fuel, wherein the transfer device comprises the one or more electrical conductors and a pressure vessel for transporting the fuel to one or both of the one or more motor assemblies or the one or more fuel cells.

21. The system of claim 20, wherein the electrical conductors are routed through an interior region or inner volume of the pressure vessel.

22. The system of claim 20, wherein the transfer device is fluidically connected to one or both of: (i) a cooling shroud providing access to the one or more motoring windings or (ii) an interior region of the one or more motor assemblies in which the one or more magnets are positioned.

23. The system of claim 16, wherein the one or more motor windings and the one or more magnets are in thermal communication with the fuel to enable a transfer of thermal energy between (i) the one or more motor windings and the one or more magnets and (ii) the fuel, wherein the one or more motor windings and the one or more magnets are configured to heat the fuel before the fuel enters the one or more fuel cells.

24. The system of claim 16, wherein the one or more fuel cells are in one or both of fluid or thermal communication with a stream of air that:
(i) cools the one or more fuel cells via convection; and
(ii) flows to the combustion chamber to one or both of (a) cool the combustion chamber or (b) facilitate combustion of the fuel.

25. The system of claim 16, further comprising a controller configured to control a distribution of power between a first motor winding and a second motor winding of the one or more motor windings, based at least in part on one or more timing signals.

26. The system of claim 25, further comprising a timing controller configured to generate the one or more timing signals, wherein the one or more timing signals convey information on a position and speed of the at least one shaft or rotor, wherein the controller is configured to monitor and control one or more parameters of a current provided to the one or more motor windings, wherein the one or more parameters comprise an alternating current timing or an amount of current.

27. The system of claim 25, wherein the controller is configured to adjust a current provided to the one or more motor windings to adjust or optimize a rotational speed of the at least one shaft or rotor based on a flight profile of the vehicle.

28. The system of claim 16, wherein the one or more fuel cells comprise a solid oxide fuel cell or a segmented solid oxide fuel cell.

29. The system of claim 16, further comprising one or more direct current to alternating current inverters and electronic commutators in electrical communication with the one or more motor assemblies, wherein the one or more direct current to alternating current inverters and electronic commutators are configured to convert the direct current electrical energy generated by the one or more fuel cells into alternating current electrical energy to power the one or more motor windings to produce electrical torque for driving the at least one shaft or rotor to produce mechanical power.

* * * * *